(12) United States Patent
Takahashi et al.

(10) Patent No.: US 10,313,827 B2
(45) Date of Patent: Jun. 4, 2019

(54) SERVER AND METHOD FOR PROVIDING CONTENT, AND COMPUTER-READABLE STORAGE MEDIUM FOR COMPUTER PROGRAM

(71) Applicant: KONICA MINOLTA, INC., Chiyoda-ku, Tokyo (JP)

(72) Inventors: Kazusei Takahashi, Nishinomiya (JP); Katsuhiko Akita, Amagasaki (JP); Hiroaki Kubo, Muko (JP); Kaitaku Ozawa, Nishinomiya (JP); Akihiro Torigoshi, Itami (JP); Yuji Okamoto, Nishinomiya (JP)

(73) Assignee: KONICA MINOLTA, INC., Hyogo (JP)

( * ) Notice: Subject to any disclaimer, the term of this patent is extended or adjusted under 35 U.S.C. 154(b) by 0 days.

(21) Appl. No.: 15/233,536

(22) Filed: Aug. 10, 2016

(65) Prior Publication Data
US 2017/0055119 A1    Feb. 23, 2017

(30) Foreign Application Priority Data

Aug. 17, 2015  (JP) ................................ 2015-160629

(51) Int. Cl.
| | | |
|---|---|---|
| *H04W 4/021* | (2018.01) | |
| *H04W 4/80* | (2018.01) | |
| *G04B 5/00* | (2006.01) | |
| *H04W 4/06* | (2009.01) | |
| *H04B 5/00* | (2006.01) | |
| *H04W 4/04* | (2009.01) | |

(52) U.S. Cl.
CPC .......... *H04W 4/021* (2013.01); *H04B 5/0031* (2013.01); *H04W 4/046* (2013.01); *H04W 4/06* (2013.01); *H04W 4/80* (2018.02)

(58) Field of Classification Search
CPC ......... H04W 4/06; H04W 4/021; H04W 4/80; H04W 4/046; H04B 5/0031
See application file for complete search history.

(56) References Cited

U.S. PATENT DOCUMENTS

| | | | |
|---|---|---|---|
| 7,890,121 B2 | 2/2011 | Matsubara | |
| 9,723,177 B2 * | 8/2017 | Ozawa | ................... H04N 1/465 |

(Continued)

FOREIGN PATENT DOCUMENTS

| | | |
|---|---|---|
| CN | 101131428 A | 2/2008 |
| CN | 101311938 A | 11/2008 |

(Continued)

OTHER PUBLICATIONS

Chinese Office Action (and English language translation thereof) dated Jan. 15, 2019 issued in counterpart Chinese Application No. 201610675524.X.

*Primary Examiner* — Asghar H Bilgrami
(74) *Attorney, Agent, or Firm* — Holtz, Holtz & Volek PC

(57) ABSTRACT

A server for providing a plurality of objects made correspond to a marker is provided. The objects have content differing from each other. The server includes a transmitter configured to preferentially send, in response to a request for the objects based on the marker, an object which has not yet been sent to any of "N" (N≥2) terminals of the objects to a requesting terminal of the "N" terminals, the requesting terminal having made the request.

15 Claims, 44 Drawing Sheets

(56) References Cited

U.S. PATENT DOCUMENTS

| | | | |
|---|---|---|---|
| 2002/0015042 A1* | 2/2002 | Robotham | G06F 3/14 345/581 |
| 2003/0024975 A1* | 2/2003 | Rajasekharan | G06F 17/30879 235/375 |
| 2004/0121724 A1* | 6/2004 | Yahagi | H04W 12/06 455/3.01 |
| 2005/0171913 A1* | 8/2005 | Kurihara | G06F 21/10 705/51 |
| 2006/0170963 A1* | 8/2006 | Aoki | G06F 3/1204 358/1.15 |
| 2007/0129914 A1* | 6/2007 | Yano | G05B 23/0283 702/184 |
| 2008/0010336 A1* | 1/2008 | Nishizawa | G06F 1/1616 709/201 |
| 2008/0051102 A1 | 2/2008 | Matsubara | |
| 2009/0165140 A1* | 6/2009 | Robinson | G06F 21/10 726/26 |
| 2009/0313383 A1* | 12/2009 | Leung | H04L 12/1859 709/235 |
| 2010/0033484 A1* | 2/2010 | Kim | G06T 19/006 345/426 |
| 2012/0042393 A1* | 2/2012 | Choi | G06F 21/10 726/28 |
| 2014/0185871 A1* | 7/2014 | Ito | G06K 9/00671 382/103 |
| 2015/0149585 A1* | 5/2015 | Zhang | G06Q 10/10 709/217 |
| 2015/0221134 A1* | 8/2015 | Koga | G06T 19/006 345/633 |
| 2015/0363076 A1* | 12/2015 | Komatsu | G06T 19/006 715/765 |
| 2016/0012612 A1* | 1/2016 | Koga | G06F 3/14 345/633 |

FOREIGN PATENT DOCUMENTS

| | | |
|---|---|---|
| CN | 102385733 A | 3/2012 |
| JP | 2012215989 A | 11/2012 |
| JP | 2013125328 A | 6/2013 |

* cited by examiner

FIG. 7
102
| CALL MARKER | PATH |
|---|---|
|  | 2015/MODEL/A/1-Contents-20150224/MRK_CAR-2015_MODEL-A |
| 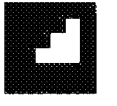 | 2015/MODEL/A/1-Contents-20150301/MRK_BIKE-2015_MODEL-X |
| ... | ... |

| MARKER INFORMATION | MARKER NAME | MRK_CAR-2015_MODEL-A |
|---|---|---|
| | ACCESS DESTINATION | 2015/MODEL/A/1-Contents-20150224/ |
| CONTENT INFORMATION | CONTENT TABLE NAME | CNT-TABLE_CAR-2015_MODEL-A |
| | TABLE STORAGE DESTINATION | 2015/MODEL/A/1-TABLE-Contents/ |
| | CONTENT DATA STORAGE DESTINATION | 2015/MODEL/A/1-Contents-3/ |
| | NUMBER OF CONTENT PIECES | 3 |

CONTENT TABLE NAME: CNT-TABLE_CAR-2015_MODEL-A

| CONTENT NUMBER | CONTENT NAME | CONTENT DATA NAME | OUTPUT DESTINATION | TRANSMISSION STATUS | MESSAGE |
|---|---|---|---|---|---|
| No.1 | BODY COLOR1 | Content1_Body-Color1 | | UNSENT | |
| No.2 | BODY COLOR2 | Content1_Body-Color2 | | UNSENT | |
| No.3 | BODY COLOR3 | Content1_Body-Color3 | | UNSENT | |

4Ca 4Ca 4Ca

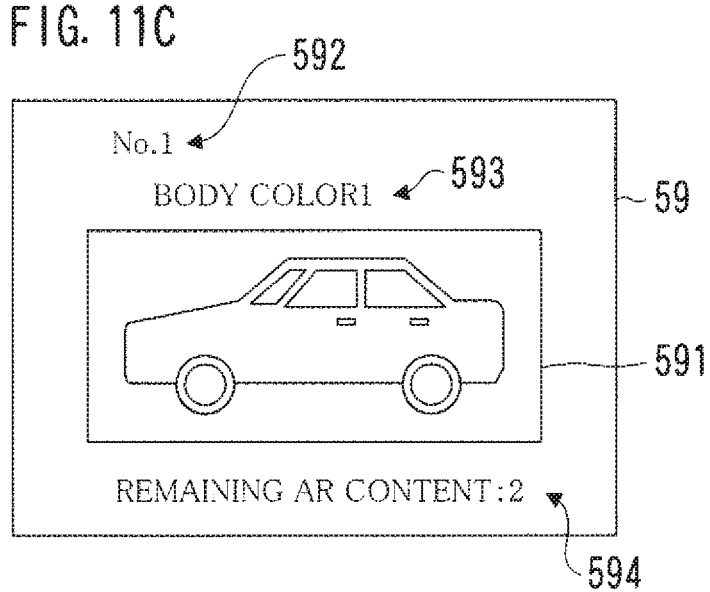

FIG. 13(A)

4C
CONTENT TABLE NAME: CNT-TABLE_CAR-2015_MODEL-A

| CONTENT NUMBER | CONTENT NAME | CONTENT DATA NAME | OUTPUT DESTINATION | TRANSMISSION STATUS | MESSAGE |
|---|---|---|---|---|---|
| No.1 | BODY COLOR1 | Content1_Body-Color1 | Tu1 | SENT | REMAINING AR CONTENT:2 — 4Ca |
| No.2 | BODY COLOR2 | Content1_Body-Color2 | | UNSENT | — 4Ca |
| No.3 | BODY COLOR3 | Content1_Body-Color3 | | UNSENT | — 4Ca |

FIG. 13(B)

4C
CONTENT TABLE NAME: CNT-TABLE_CAR-2015_MODEL-A

| CONTENT NUMBER | CONTENT NAME | CONTENT DATA NAME | OUTPUT DESTINATION | TRANSMISSION STATUS | MESSAGE |
|---|---|---|---|---|---|
| No.1 | BODY COLOR1 | Content1_Body-Color1 | Tu1 | SENT | REMAINING AR CONTENT:2 — 4Ca |
| No.2 | BODY COLOR2 | Content1_Body-Color2 | Tu2 | SENT | REMAINING AR CONTENT:1 — 4Ca |
| No.3 | BODY COLOR3 | Content1_Body-Color3 | | UNSENT | — 4Ca |

FIG. 13(C)

4C
CONTENT TABLE NAME: CNT-TABLE_CAR-2015_MODEL-A

| CONTENT NUMBER | CONTENT NAME | CONTENT DATA NAME | OUTPUT DESTINATION | TRANSMISSION STATUS | MESSAGE |
|---|---|---|---|---|---|
| No.1 | BODY COLOR1 | Content1_Body-Color1 | Tu1 | SENT | REMAINING AR CONTENT:2 — 4Ca |
| No.2 | BODY COLOR2 | Content1_Body-Color2 | Tu2 | SENT | REMAINING AR CONTENT:1 — 4Ca |
| No.3 | BODY COLOR3 | Content1_Body-Color3 | Tu3 | SENT | REMAINING AR CONTENT:0 — 4Ca |

592 → No.2-1
593 → INTERIOR COLOR1
591, 511(5)
REMAINING AR CONTENT: 1/7
594 → REMAINING ITEM 2: 1

FIG. 16

| | | 4G |
|---|---|---|
| MARKER INFORMATION | MARKER NAME | MRK_CAR-2015_MODEL-A-Rev2 |
| | ACCESS DESTINATION | 2015/MODEL/A/1-Contents-20150402/ |
| CONTENT INFORMATION | CONTENT TABLE NAME | CNT-TABLE_CAR-2015_MODEL-A-rev2 |
| | TABLE STORAGE DESTINATION | 2015/MODEL/A/1-TABLE-Contents/rev2/ |
| | CONTENT DATA STORAGE DESTINATION | 2015/MODEL/A/1-Contents-3/rev2 |
| | TOTAL NUMBER OF CONTENT PIECES | 7 |
| | NUMBER OF ITEMS | 2 |
| | NUMBER OF CONTENT PIECES_1 | 3 |
| | NUMBER OF CONTENT PIECES_2 | 4 |

CONTENT TABLE NAME: CNT_TABLE_CAR-2015_MODEL-A-rev2

| ITEM NUMBER | CONTENT NUMBER | CONTENT NAME | CONTENT DATA NAME | OUTPUT DESTINATION | TRANSMISSION STATUS | MESSAGE |
|---|---|---|---|---|---|---|
| 1 | 1 | BODY COLOR1 | Content1_Body-Color1 | | UNSENT | |
| 1 | 2 | BODY COLOR2 | Content1_Body-Color2 | | UNSENT | |
| 1 | 3 | BODY COLOR3 | Content1_Body-Color3 | | UNSENT | |
| 2 | 1 | INTERIOR COLOR1 | Content2_Interior-Color1 | | UNSENT | |
| 2 | 2 | INTERIOR COLOR2 | Content2_Interior-Color2 | | UNSENT | |
| 2 | 3 | INTERIOR COLOR3 | Content2_Interior-Color3 | | UNSENT | |
| 2 | 4 | INTERIOR COLOR4 | Content2_Interior-Color4 | | UNSENT | |

4Ha (rows)

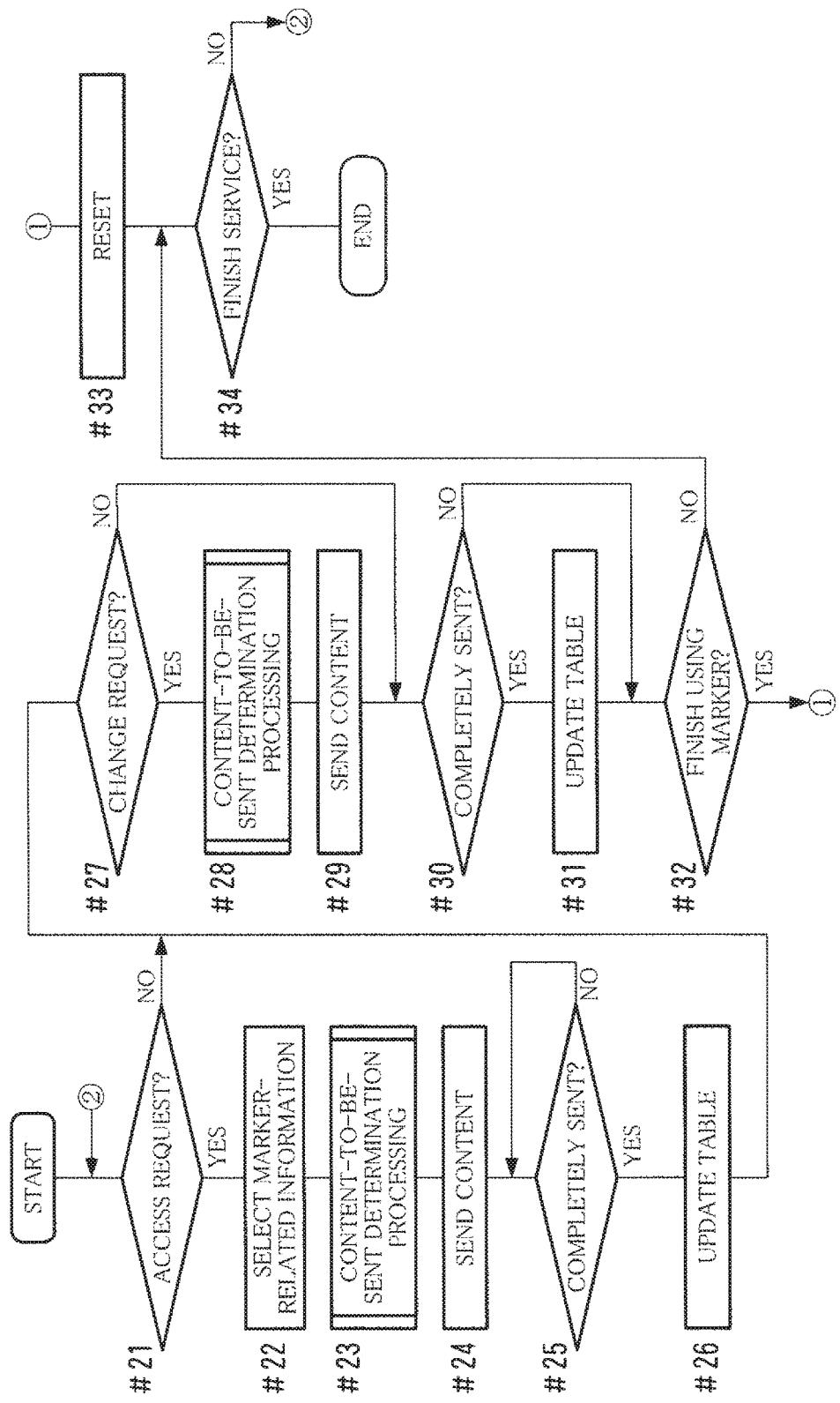

FIG. 21

CONTENT TABLE NAME:CNT-TABLE_CAR-2015_MODEL-A-rev2

| ITEM NUMBER | CONTENT NUMBER | CONTENT NAME | CONTENT DATA NAME | OUTPUT DESTINATION | TRANSMISSION STATUS | MESSAGE |
|---|---|---|---|---|---|---|
| 1 | 1 | BODY COLOR1 | Content1_Body-Color1 | Tu1 | SENT | REMAINING AR CONTENT:6/7 REMAINING ITEM 1:2 |
| 1 | 2 | BODY COLOR2 | Content1_Body-Color2 | Tu2 | SENT | REMAINING AR CONTENT:5/7 REMAINING ITEM 1:1 |
| 1 | 3 | BODY COLOR3 | Content1_Body-Color3 | Tu3 | SENT | REMAINING AR CONTENT:4/7 REMAINING ITEM 1:0 |
| 2 | 1 | INTERIOR COLOR1 | Content2_Interior-Color1 | | UNSENT | |
| 2 | 2 | INTERIOR COLOR2 | Content2_Interior-Color2 | | UNSENT | |
| 2 | 3 | INTERIOR COLOR3 | Content2_Interior-Color3 | | UNSENT | |
| 2 | 4 | INTERIOR COLOR4 | Content2_Interior-Color4 | | UNSENT | |

CONTENT TABLE NAME:CNT-TABLE_CAR-2015_MODEL-A-rev2

| ITEM NUMBER | CONTENT NUMBER | CONTENT NAME | CONTENT DATA NAME | OUTPUT DESTINATION | TRANSMISSION STATUS | MESSAGE |
|---|---|---|---|---|---|---|
| 1 | 1 | BODY COLOR1 | Content1_Body-Color1 | | SENT | |
| 1 | 2 | BODY COLOR2 | Content1_Body-Color2 | | SENT | |
| 1 | 3 | BODY COLOR3 | Content1_Body-Color3 | | SENT | |
| 2 | 1 | INTERIOR COLOR1 | Content2_Interior-Color1 | Tu1 | SENT | REMAINING AR CONTENT:1/7 REMAINING ITEM 2:1 |
| 2 | 2 | INTERIOR COLOR2 | Content2_Interior-Color2 | Tu2 | SENT | REMAINING AR CONTENT:1/7 REMAINING ITEM 2:1 |
| 2 | 3 | INTERIOR COLOR3 | Content2_Interior-Color3 | Tu3 | SENT | REMAINING AR CONTENT:1/7 REMAINING ITEM 2:1 |
| 2 | 4 | INTERIOR COLOR4 | Content2_Interior-Color4 | | UNSENT | |

CONTENT TABLE NAME:CNT-TABLE_CAR-2015_MODEL-A-rev2

| ITEM NUMBER | CONTENT NUMBER | CONTENT NAME | CONTENT DATA NAME | OUTPUT DESTINATION | TRANSMISSION STATUS | MESSAGE | |
|---|---|---|---|---|---|---|---|
| 1 | 1 | BODY COLOR1 | Content1_Body-Color1 | | SENT | | 4Ha |
| 1 | 2 | BODY COLOR2 | Content1_Body-Color2 | | SENT | | 4Ha |
| 1 | 3 | BODY COLOR3 | Content1_Body-Color3 | | SENT | | 4Ha |
| 2 | 1 | INTERIOR COLOR1 | Content2_Interior-Color1 | | SENT | | 4Ha |
| 2 | 2 | INTERIOR COLOR2 | Content2_Interior-Color2 | Tu1 | SENT | REMAINING AR CONTENT:0/7 REMAINING ITEM 2:0 | 4Ha |
| 2 | 3 | INTERIOR COLOR3 | Content2_Interior-Color3 | Tu2 | SENT | REMAINING AR CONTENT:0/7 REMAINING ITEM 2:0 | 4Ha |
| 2 | 4 | INTERIOR COLOR4 | Content2_Interior-Color4 | Tu3 | SENT | REMAINING AR CONTENT:0/7 REMAINING ITEM 2:0 | 4Ha |

CONTENT TABLE NAME:CNT-TABLE.CAR-2015_MODEL.-A
GROUP NAME:GROUP 01

| CONTENT NUMBER | CONTENT NAME | CONTENT DATA NAME | OUTPUT DESTINATION | TRANSMISSION STATUS | MESSAGE | CONNECTION START DATE/TIME | DISCONNECTION DATE/TIME |
|---|---|---|---|---|---|---|---|
| No.1 | BODY COLOR1 | Content1_Body-Color1 | | UNSENT | | | | 4Ma |
| No.2 | BODY COLOR2 | Content1_Body-Color2 | | UNSENT | | | | 4Ma |
| No.3 | BODY COLOR3 | Content1_Body-Color3 | | UNSENT | | | | 4Ma |

FIG. 26

CONTENT TABLE NAME:
CNT-TABLE_CAR-2015_MODEL-A

TIME-LIMIT: 20 MINUTES

EXCEPTIONAL ATTRIBUTE: 1

CONTENT TABLE NAME:CNT-TABLE_CAR-2015_MODEL-A

GROUP NAME:GROUP 01

| CONTENT NUMBER | ... | OUTPUT DESTINATION | TRANSMISSION STATUS | ... | CONNECTION START DATE/TIME | DISCONNECTION DATE/TIME | |
|---|---|---|---|---|---|---|---|
| No.1 | ... | Tu1 | SENT | ... | 2015/4/15 13:30 | CONNECTING | ← 4Wa |
| No.2 | ... | | UNSENT | ... | | | ← 4Wa |
| No.3 | ... | | UNSENT | ... | | | ← 4Wa |

CONTENT TABLE NAME: CNT-TABLE_CAR-2015_MODEL-A

GROUP NAME: GROUP 01

| CONTENT NUMBER | ... | OUTPUT DESTINATION | TRANSMISSION STATUS | ... | CONNECTION START DATE/TIME | DISCONNECTION DATE/TIME |
|---|---|---|---|---|---|---|
| No.1 | ... | Tu1 | SENT | ... | 2015/4/15 13:30 | CONNECTING |
| No.2 | ... | Tu2 | SENT | ... | 2015/4/15 13:35 | CONNECTING |
| No.3 | ... | | UNSENT | ... | | |

CONTENT TABLE NAME:CNT-TABLE_CAR-2025_MODEL-A
GROUP NAME:GROUP 02

| CONTENT NUMBER | ... | OUTPUT DESTINATION | TRANSMISSION STATUS | ... | CONNECTION START DATE/TIME | DISCONNECTION DATE/TIME |
|---|---|---|---|---|---|---|
| No.1 | ... | Tp1 | SENT | ... | 2015/4/15 13:58 | CONNECTING |
| No.2 | ... | | | ... | | |
| No.3 | ... | | | ... | | |

CONTENT TABLE NAME:CNT-TABLE_CAR-2025_MODEL-A

GROUP NAME:GROUP 02

| CONTENT NUMBER | ... | OUTPUT DESTINATION | TRANSMISSION STATUS | ... | CONNECTION START DATE/TIME | DISCONNECTION DATE/TIME |
|---|---|---|---|---|---|---|
| No.1 | ... | Tp1 | SENT | ... | 2015/4/15 13:58 | CONNECTING | ← 4Ma
| No.2 | ... | Tp2 | SENT | ... | 2015/4/15 14:01 | CONNECTING | ← 4Ma
| No.3 | ... | | UNSENT | ... | | | ← 4Ma

| OPERATION | | AR SERVER-SIDE PROCESSING DETAILS | | RETURN TO ORIGINAL DISPLAY (AFTER DISPLAY OF LAST-NUMBERED CONTENT, CHANGE CONTENT TO FIRST-NUMBERED CONTENT) |
|---|---|---|---|---|
| TYPE | DIRECTION | PROCESSING | DETAILS | |
| SWIPE | UP | CHANGE IN CONTENT | • ITEM NUMBER: REMAIN UNCHANGED<br>• CONTENT NUMBER: +1 | YES |
| | DOWN | CHANGE IN CONTENT | • ITEM NUMBER: REMAIN UNCHANGED<br>• CONTENT NUMBER: −1 | YES |
| | RIGHT | CHANGE IN CONTENT | • ITEM NUMBER: +1<br>• CONTENT NUMBER: REMAIN UNCHANGED | YES |
| | LEFT | CHANGE IN CONTENT | • ITEM NUMBER: −1<br>• CONTENT NUMBER: REMAIN UNCHANGED | YES |
| SHAKE | VERTICAL | CHANGE IN CONTENT | • CONTENT NUMBER: +1 | NO |
| | HORIZONTAL | CHANGE IN CONTENT | • ITEM NUMBER: +1 | NO |
| TILT | UP | — | — | — |
| | DOWN | — | — | — |
| | RIGHT | — | — | — |
| | LEFT | — | — | — |

SERVER AND METHOD FOR PROVIDING CONTENT, AND COMPUTER-READABLE STORAGE MEDIUM FOR COMPUTER PROGRAM

This application is based on Japanese patent application No. 2015-160629 filed on Aug. 17, 2015, the contents of which are hereby incorporated by reference.

BACKGROUND OF THE INVENTION

1. Field of the Invention

The present invention relates to a technology for providing a terminal with content.

2. Description of the Related Art

Recent years have seen the widespread use of Augmented Reality (AR) technology.

According to the AR technology, when a printed matter having an AR marker thereon is photographed by a terminal such as a tablet computer or a smartphone, content corresponding to the AR marker is displayed in a display unit of the terminal together with an image of the photographed printed matter.

This enables a user to feel as if the actual space were augmented. In other words, this gives the user more realistic feeling than is conventionally possible.

As an example of the AR technology, the following technology has been proposed. A condition storage unit of an AR content server stores each marker added to a product package in association with plural types of content and conditions for providing each of the plural types of content. When a terminal transmits a request for providing content to the AR content server, one of the plural types of content is selected on the basis of the providing conditions stored in the condition storage unit. The AR content server transmits the selected content to the terminal. The terminal superimposes the content received from the AR content server on an image obtained by a camera and displays the superimposed image on a display (English abstract of Japanese Laid-open Patent Publication No. 2012-215989).

The following technology has also been proposed. Detailed information associated with an object is set in augmented information (tag). Before the detailed information for the object is displayed, respective display areas of the augmented information (tag) are selected by a user to enable the user to select detailed information needed by him or her (English abstract of Japanese Laid-open Patent Publication No. 2013-125328).

According to the conventional technologies, when a marker is sent from a terminal to a server, any of pieces of content corresponding to the marker is provided from the server to the terminal as discussed above.

According to the conventional technologies, however, it is difficult for a user to compare between content pieces because the content pieces cannot be displayed at one time and are displayed only one piece by one piece. It may be possible to reduce the size of content pieces to display the reduced content pieces in a screen. Unfortunately, this leads to reduction in the visibility.

SUMMARY

The present invention has been achieved in light of such an issue, and an object thereof is to provide a plurality of pieces of content corresponding to a marker in such a manner that a user compares between the pieces of content more easily than is conventionally possible.

A server according to one aspect of the present invention is a server for providing a plurality of objects made correspond to a marker, the objects having content differing from each other. The server includes a transmitter configured to preferentially send, in response to a request for the objects based on the marker, an object which has not yet been sent to any of "N" (N≥2) terminals of the objects to a requesting terminal of the "N" terminals, the requesting terminal having made the request.

Preferably, all of the objects are given a predetermined sequential order, and the transmitter transmits, to all of the "N" terminals, any of the objects different from one another of the objects, and, when first operation is made in any of the "N" terminals after the transmission by the transmitter, the transmitter sends, to all of the "N" terminals, an object next to the object which has just been transmitted of the objects.

Preferably, each of the objects is classified into any of a plurality of items, and the transmitter transmits, to all of the "N" terminals, an object different in any one of the items of the objects, and, when second operation is made in any of the "N" terminals after the transmission by the transmitter, the transmitter sends, to all of the "N" terminals, an object different in another item of the items.

These and other characteristics and objects of the present invention will become more apparent by the following descriptions of preferred embodiments with reference to drawings.

BRIEF DESCRIPTION OF THE DRAWINGS

FIG. 7 is a diagram showing an example of a call marker storage portion.

FIG. 8 is a diagram showing an example of attribute data.

FIG. 9 is a diagram showing an example of a content table.

FIGS. 11A through 11C are diagrams showing an example as to how to generate image data on content.

FIGS. 13(A) through 13(C) are transition diagrams showing a content table.

FIG. 16 is a diagram showing an example of attribute data.

FIG. 17 is a diagram showing an example of a content table.

FIG. 20 is a flowchart depicting an example of the flow of the entire processing by a document server.

FIG. 21 is a diagram showing an example of a content table.

FIG. 22 is a diagram showing an example of a content table.

FIG. 23 is a diagram showing an example of a content table.

FIG. 25 is a diagram showing an example of a content table.

FIG. 26 is a diagram showing an example of group participation control data.

FIGS. 30A and 30B are diagrams showing an example of a content table.

FIGS. 31A and 31B are diagrams showing an example of a content table.

FIG. 32 is a diagram showing an example of operation assignment data.

DESCRIPTION OF THE PREFERRED EMBODIMENTS

First Embodiment

Figure 1:
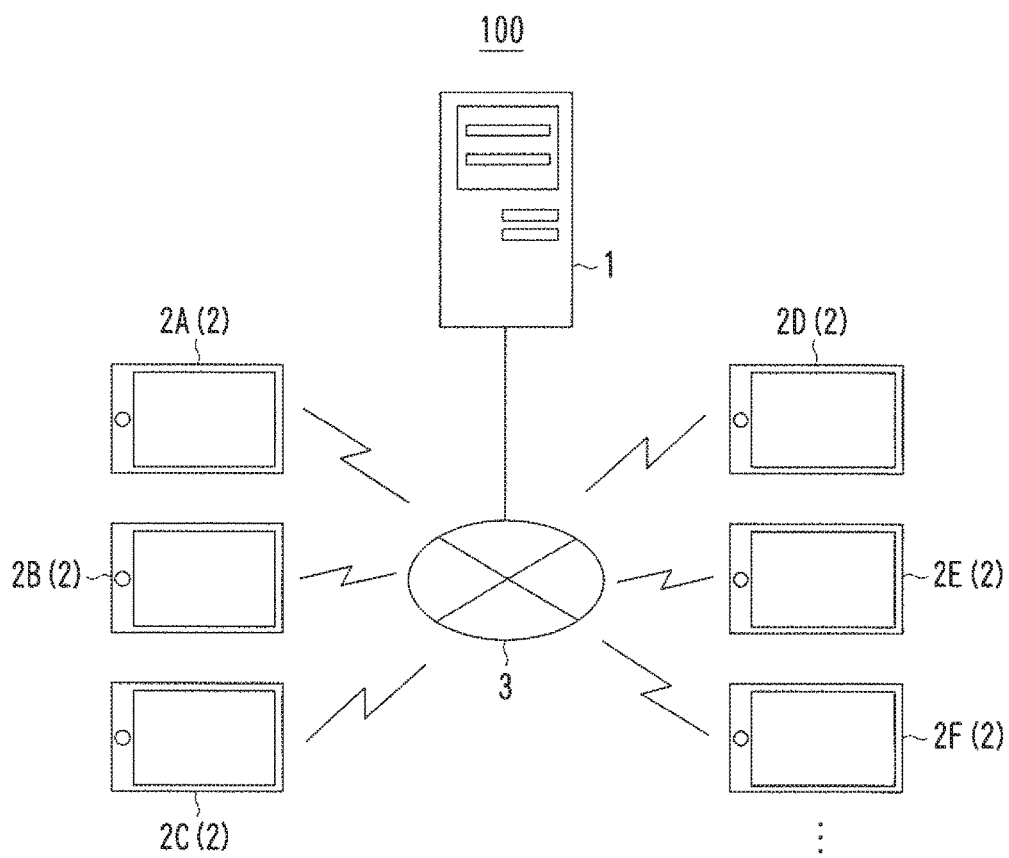
FIG. 1 is a diagram showing an example of the overall configuration of a document viewing system.
Figure 2:
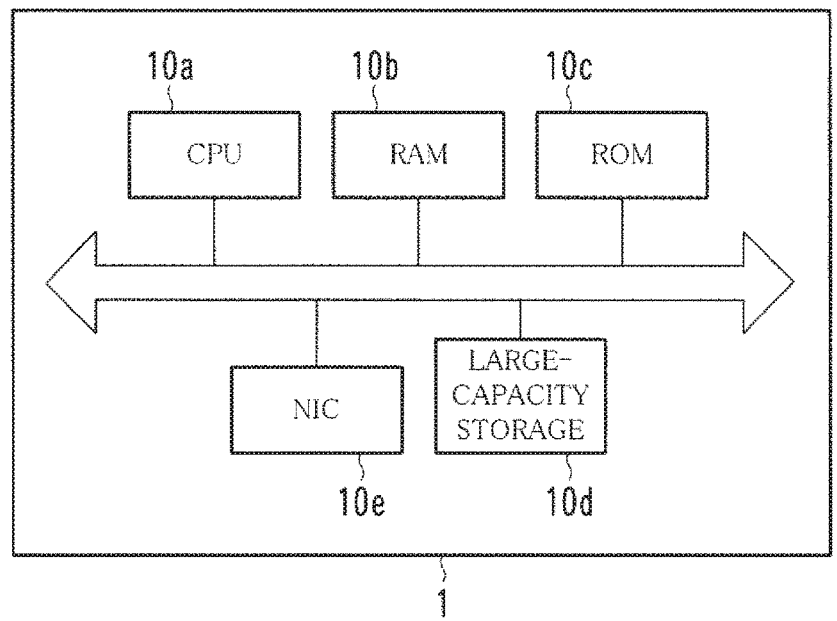
FIG. 2 is a diagram showing an example of the hardware configuration of a document server.
Figure 3:
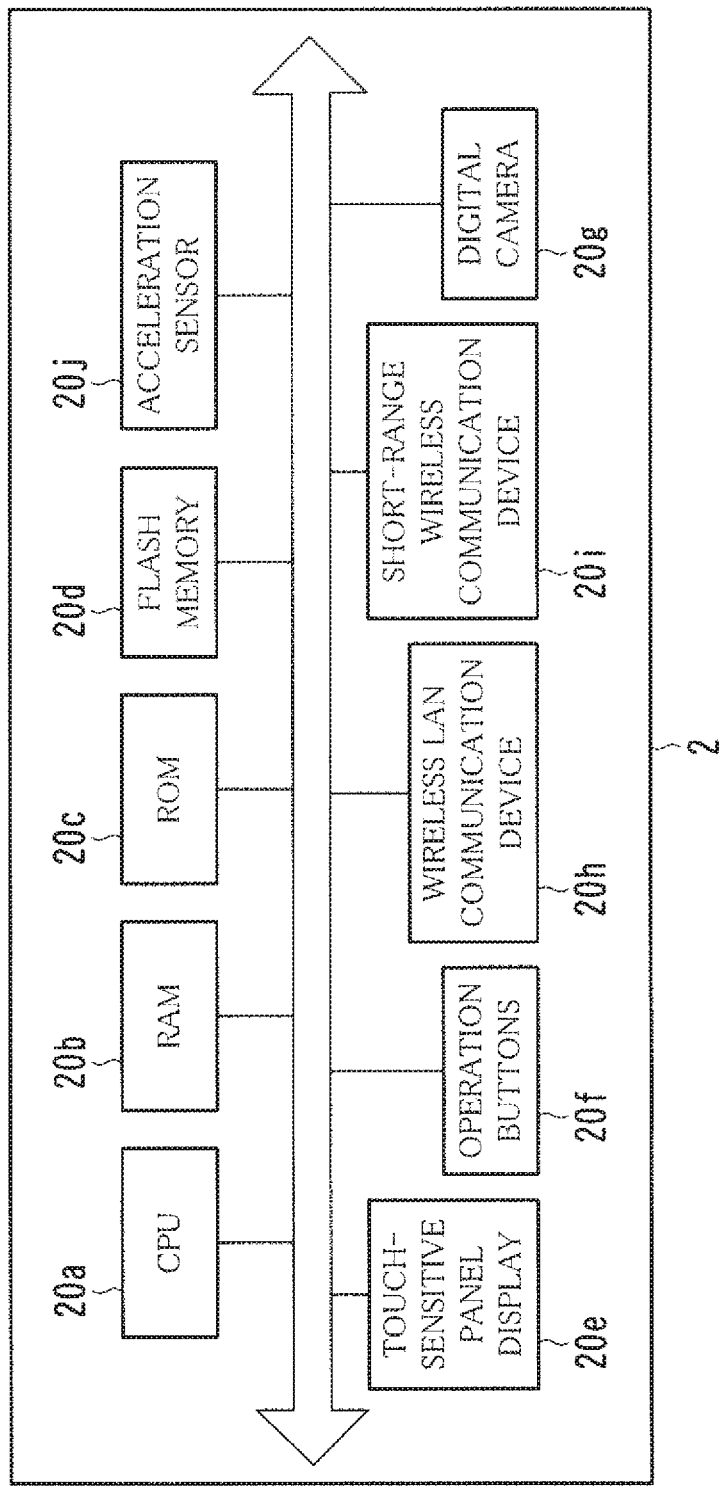
FIG. 3 is a diagram showing an example of the hardware configuration of a terminal.
Figure 4A:
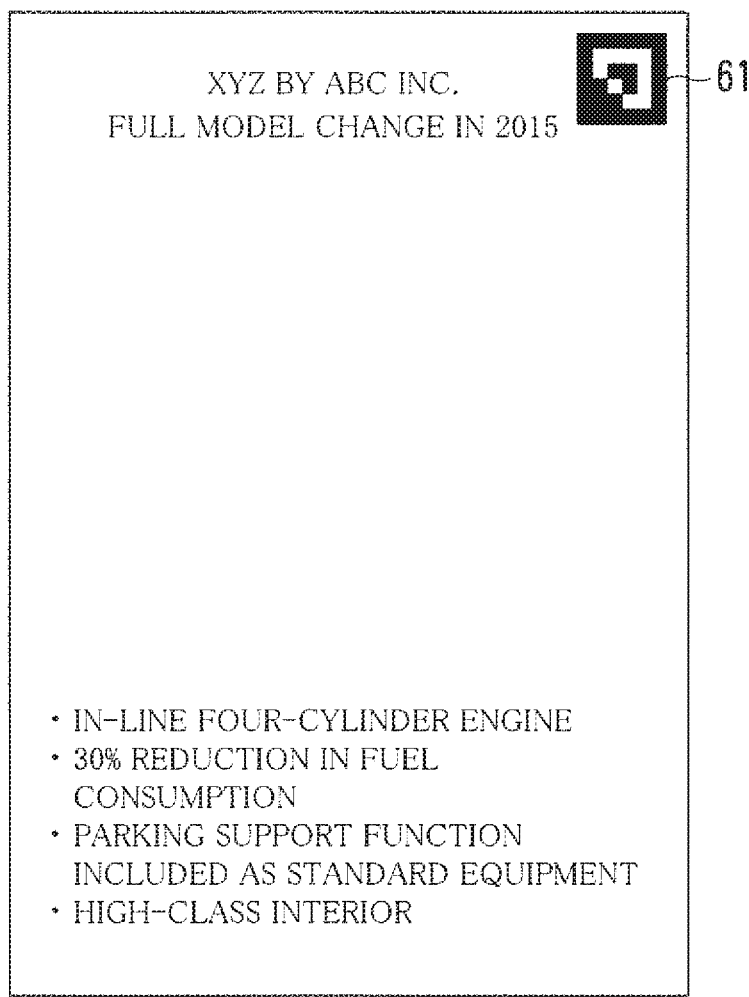
FIGS. 4A and 4B are diagrams showing an example of a printed matter.
Figure 4B:
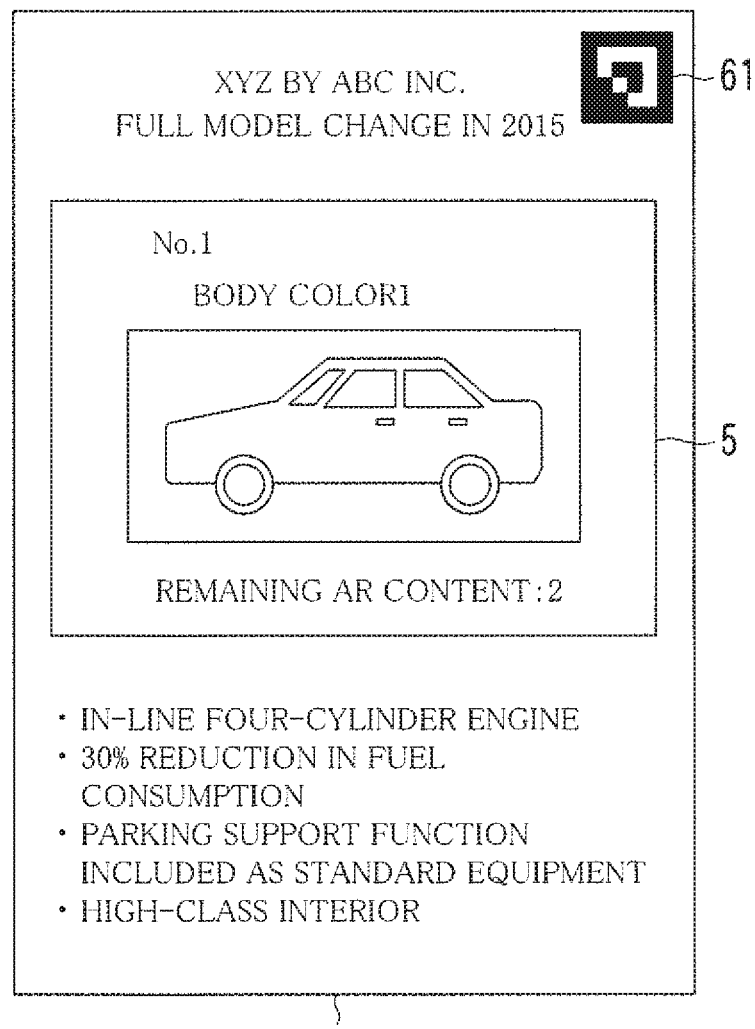
Figure 5A:
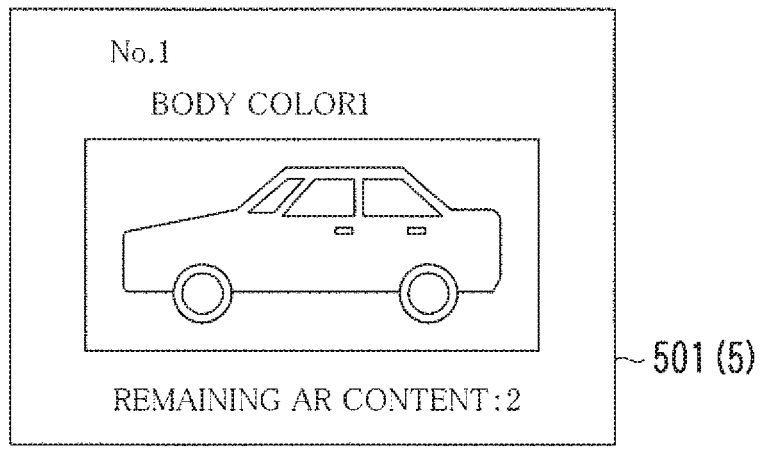
FIGS. 5A through 5C are diagrams showing an example of content.
Figure 5B:
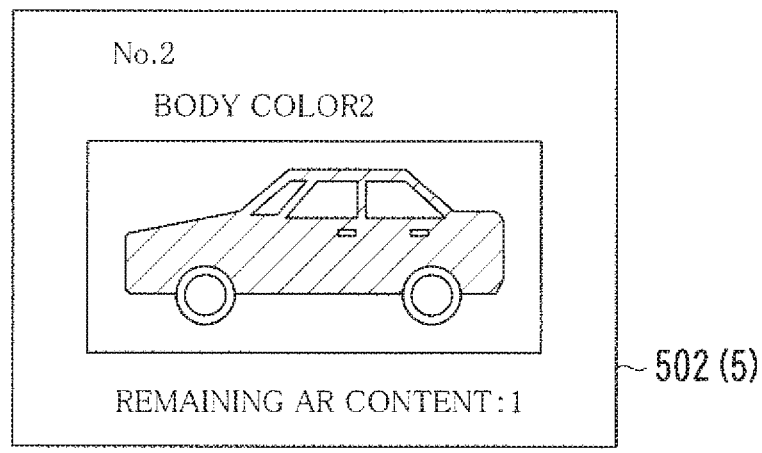
Figure 5C:
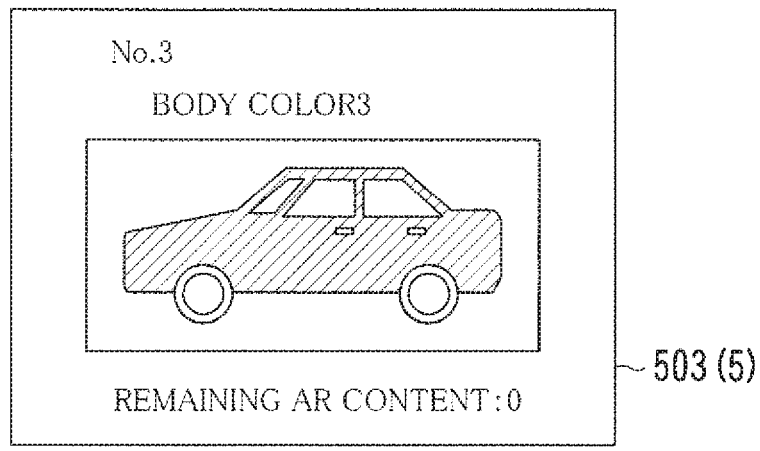

FIG. 1 is a diagram showing an example of the overall configuration of a document viewing system 100. FIG. 2 is a diagram showing an example of the hardware configuration of a document server 1. FIG. 3 is a diagram showing an example of the hardware configuration of a terminal 2. FIGS. 4A and 4B are diagrams showing an example of a printed matter 6. FIGS. 5A through 5C are diagrams showing an example of content 501 through content 503.

Referring to FIG. 1, the document viewing system 100 is configured of the document server 1, the terminals 2, a communication line 3, and so on.

The document server 1 and the terminals 2 are configured to perform communication with one another via the communication line 3. Examples of the communication line 3 are the Internet, a Local Area Network (LAN), a public line, and a dedicated line.

The document server 1 stores data for displaying a document therein and provides data in response to a request made by the terminal 2. As the document server 1, a server machine for web server is used. The document server 1 may be a so-called cloud server.

Referring to FIG. 2, the document server 1 is configured of a Central Processing Unit (CPU) 10a, a Random Access Memory (RAM) 10b, a Read Only Memory (ROM) 10c, a large-capacity storage 10d, a Network Interface Card (NIC) 10e, and so on.

The NIC 10e performs communication with the terminal 2 in accordance with a protocol such as Transmission Control Protocol/Internet Protocol (TCP/IP).

The ROM 10c or the large-capacity storage 10d stores, therein, a document providing program 10P. The document providing program 10P is loaded into the RAM 10b and is executed by the CPU 10a. Examples of the large-capacity storage 10d are a hard disk drive and a Solid State Drive (SSD). The document providing program 10P is described later.

The terminal 2 downloads a document from the document server 1 to display the document. The terminal 2 is, for example, a tablet computer, a smartphone, or a personal computer. Hereinafter, an example is described in which the terminal 2 is a tablet computer.

Referring to FIG. 3, the terminal 2 is configured of a CPU 20a, a RAM 20b, a ROM 20c, a flash memory 20d, a touch-sensitive panel display 20e, operation buttons 20f, a digital camera 20g, a wireless LAN communication device 20h, a short-range wireless communication device 20i, an acceleration sensor 20j, and so on.

The touch-sensitive panel display 20e displays, for example, a screen for presenting messages to a user, a screen for allowing the user to enter commands or information, and a document downloaded from the document server 1.

The operation buttons 20f include a button for returning to a start screen, a button for controlling sound volume, and a button for switching between ON and OFF of the power source.

The digital camera 20g photographs different images. In this embodiment, the digital camera 20g is used to photograph, in particular, an AR marker.

The wireless LAN communication device 20h performs communication with the document server 1 through a base station constituting the communication line 3 in accordance with a protocol such as TCP/IP.

The short-range wireless communication device 20i performs near field communication based on standards of Bluetooth (registered trademark), Infrared Data Association (IrDA), wireless Universal Serial Bus (USB), and so on.

The acceleration sensor 20j is to detect the posture of the terminal 2. The acceleration sensor 20j is used to detect, in particular, for the user to shake or tilt the terminal 2.

The ROM 20c or the flash memory 20d stores a document viewing program 20P therein.

The document viewing program 20P is loaded into the RAM 20b as necessary and executed by the CPU 20a. The document viewing program 20P is described later.

Hereinafter, the terminals 2 are sometimes distinguished from one another as a "terminal 2A", a "terminal 2B", a "terminal 2C", and so on.

The document viewing system 100 enables providing a Portable Document Format (PDF) file and the like. In addition, the document viewing system 100 also enables reproducing a document by using the Augmented Reality (AR) technology. At this time, the printed matter 6 is used.

As shown in FIG. 4A, the printed matter 6 has a call marker 61 and content (object) of a part of the document printed thereon.

When the user uses the digital camera 20g of the terminal 2 to take an image of the whole or a part of the printed matter 6 so as to, at least, include an image of the call marker 61, the terminal 2 downloads, from the document server 1, image data on the content 5 which is made to correspond to the call marker 61. The terminal 2 then superimposes the content 5 on the photographed image of the printed matter 6 and displays the resultant as shown in FIG. 4B.

The call marker 61 is used to call content of some of the remaining part of the document from the document server 1. The call marker 61 is, for example, an AR marker.

The document viewing system 100 further enables one document to be viewed on the terminals 2 at the same time. At this time, even when one call marker 61 is photographed, the document viewing system 100 enables displaying content 5 different for each terminal 2. For example, as the content 5 for a car-related document shown in FIGS. 5A through 5C, content 501, content 502, and content 503 can be displayed in the terminal 2A, the terminal 2B, and the terminal 2C, respectively at the same time. Each of the pieces of content 5 is generally called "AR content".

Hereinafter, a mechanism is described for providing AR content pieces from the document server 1 to the terminals 2.

Figure 6:
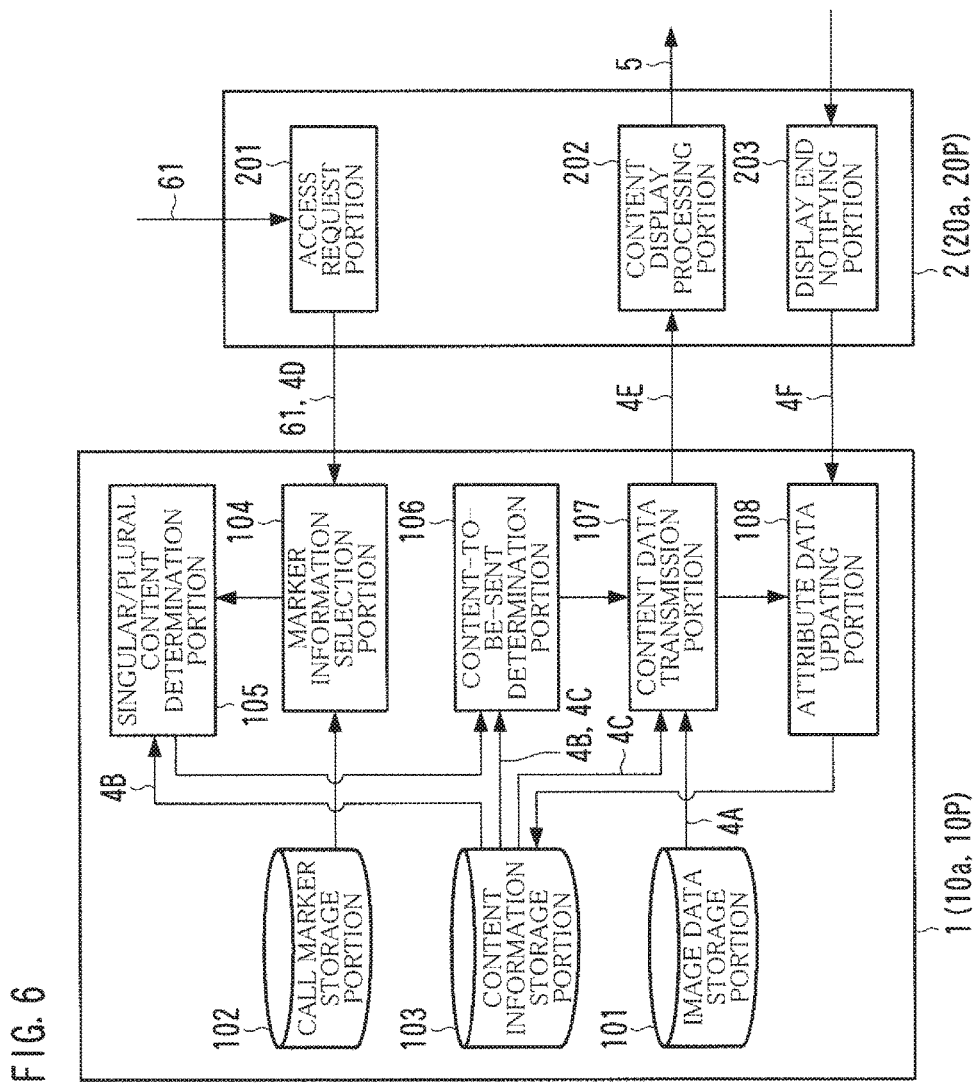
FIG. 6 is a diagram showing an example of the functional configuration of a document server and the functional configuration of a terminal.

FIG. 6 is a diagram showing an example of the functional configuration of the document server 1 and the functional configuration of each of the terminals 2.

The document providing program 10P implements, in the document server 1, an image data storage portion 101, a call marker storage portion 102, a content information storage portion 103, a marker information selection portion 104, a singular/plural content determination portion 105, a content-to-be-sent determination portion 106, a content data transmission portion 107, an attribute data updating portion 108, and so on, all of which are shown in FIG. 6.

The document viewing program 20P implements, in the terminal 2, an access request portion 201, a content display processing portion 202, a display end notifying portion 203, and so on.

[Data]

FIG. 7 is a diagram showing an example of the call marker storage portion 102. FIG. 8 is a diagram showing an example of attribute data 4B. FIG. 9 is a diagram showing an example of a content table 4C.

The image data storage portion 101 of the document server 1 has a directory for each call marker 61. Image data 4A showing the whole or a part of content 5 for each call marker 61 is stored in a directory of that call marker 61.

As shown in FIGS. 5A through 5C, a call marker 61 is made to correspond to pieces of content 5. As for such a call marker 61, image data 4A for each piece of content 5 is stored in the image data storage portion 101. The image data 4A is given, as an identifier, a content data name such as "Content1_Body-Color1".

Referring to FIG. 7, the call marker storage portion 102 stores, therein, a path corresponding to each of the call markers 61. The "path" is a path to the attribute data 4B described later. That is to say, the "path" shows a directory name of a directory storing the attribute data 4B therein, and a data name.

The content information storage portion 103 stores, therein, the attribute data 4B and the content table 4C as discussed below.

Referring to FIG. 8, the attribute data 4B is stored for each document. The attribute data 4B indicates marker information and content information.

The marker information includes a marker name and an access destination. The "marker name" is an identifier to identify the call marker 61. The marker name is also used as a data name of the attribute data 4B. The "access destination" is a directory name of a directory where the attribute data 4B is stored. In short, the marker information shows a path to the attribute data 4B.

The content information includes information on a content table name, a table storage destination, a content data storage destination, and the number of content pieces.

The "content table name" is a data name of the content table 4C of the call marker 61 relating to the attribute data 4B. The "table storage destination" is a directory name of a directory where the content table 4C is stored (saved). The content table 4C is described later.

The "content data storage destination" is a directory name of a directory where the image data 4A on the content 5 corresponding to the call marker 61 is stored (saved). The "number of content pieces" is the number of pieces of content 5 corresponding to the call marker 61. Strictly speaking, the "number of content pieces" is the number of pieces of main content 591 described below.

The content information storage portion 103 stores, therein, the content table 4C for each call marker 61. Referring to FIG. 9, the content table 4C stores a record 4Ca for each piece of the content 5 corresponding to the call marker 61 (strictly speaking, for each piece of main content 591). Each of the records 4Ca shows information on a content number, a content name, a content data name, an output destination, a transmission status, and a message of each piece of the content 5.

The "content number" is the sequence number of the content 5. The "content name" is the name of the content 5.

The "content data name" is the content data name of the image data 4A on the content 5.

The values of the content number, content name, and content data name are basically not changed.

The "output destination" shows an identifier, among the terminals 2A, 2B, and so on, of the terminal 2 which currently displays the content 5. Examples of the identifier are an IP address, a Media Access Control (MAC) address, and a host name.

The "transmission status" indicates whether or not the content 5 has been already sent to the terminal 2. The value of "sent" means that the content 5 has been already sent to the terminal 2. The value of "unsent" means that the content 5 has not yet been sent to the terminal 2.

The "message" is one of objects of text (character string) forming the content 5.

The values of the output destination, the transmission status, and the message are updated appropriately. The initial value of each of the output destination and the message is NULL (vacant). The initial value of the transmission status is "unsent".

[Processing for Providing Content 5]

Figure 10:
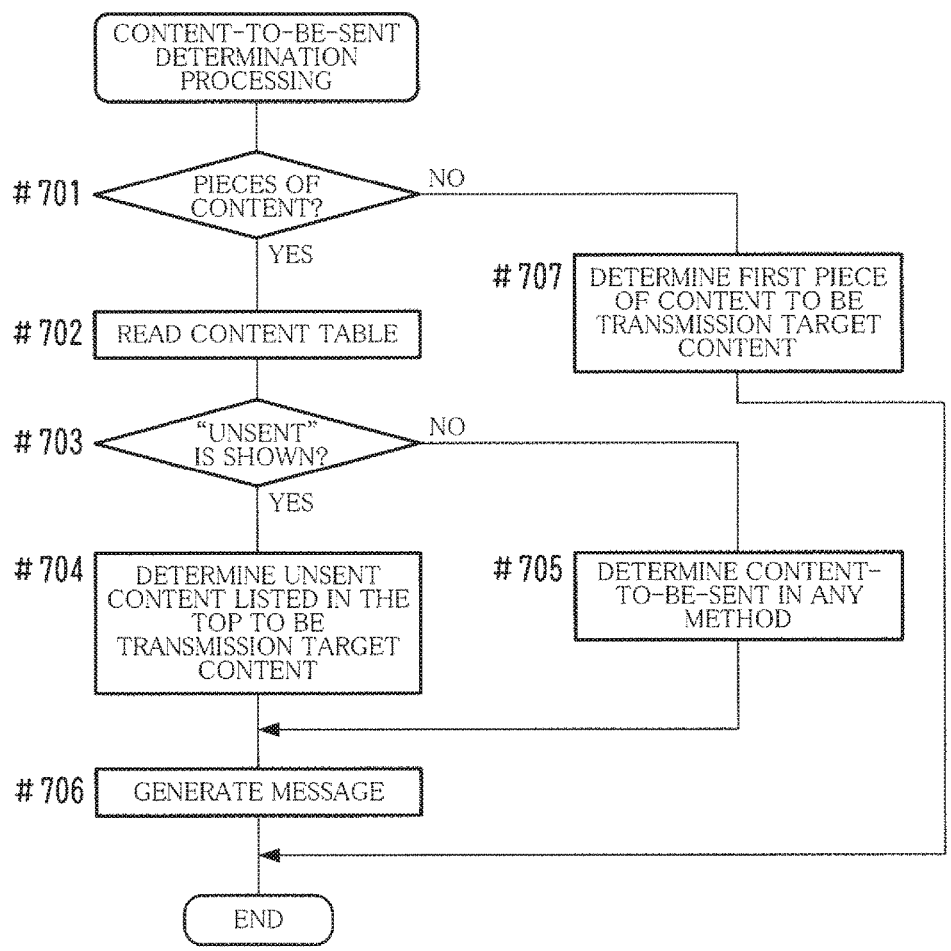
FIG. 10 is a flowchart depicting an example of the flow of first content determination processing.
Figure 11A:
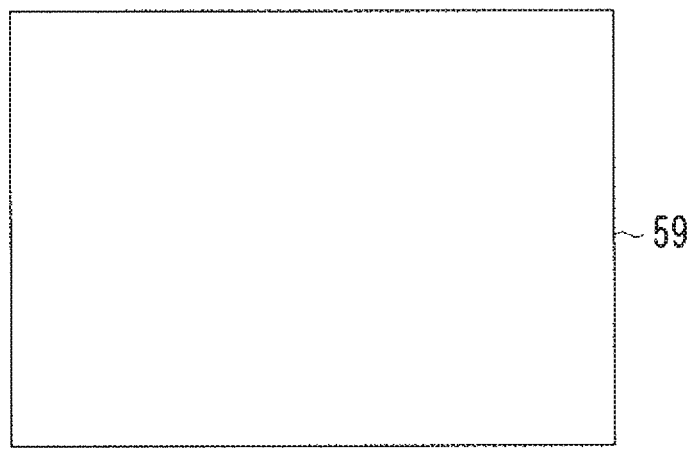
Figure 11B:
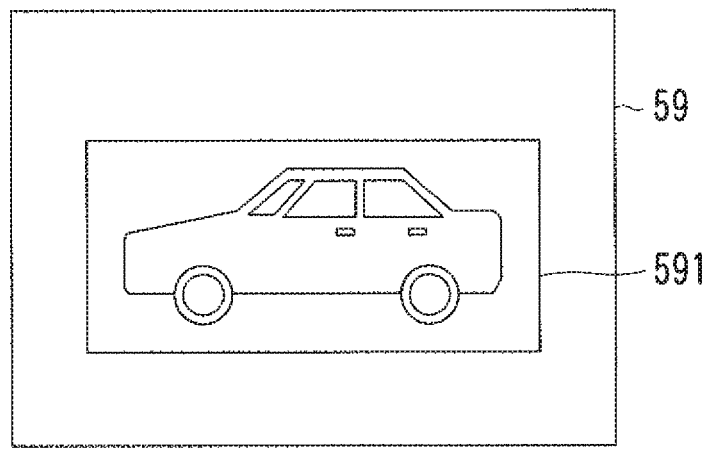

FIG. 10 is a flowchart depicting an example of the flow of first content determination processing. FIGS. 11A through 11C are diagrams showing an example as to how to generate image data on content 5.

The user uses his/her terminal 2 to start the document viewing program 20P. In response to the operation, the access request portion 201 of the terminal 2 performs processing for making a request to access the content 5, for example, in the following manner.

The access request portion 201 starts operation of the digital camera 20g of the terminal 2. Thereby, the digital camera 20g photographs at regular intervals (every 0.1 second, for example).

The access request portion 201 also displays the image photographed by the digital camera 20g in the touch-sensitive panel display 20e. The access request portion 201 also displays a message prompting the user to put an AR marker within the photograph range in the touch-sensitive panel display 20e.

The user achieves the focus of the lens of the digital camera 20g on the call marker 61 of the printed matter 6.

In response to the user operation, the access request portion 201 of the terminal 2 detects the call marker 61 in the photographed image to extract the call marker 61. The access request portion 201 then sends the access request data 4D and image data on the call marker 61 to the document server 1, and makes a request to the document server 1 to access the content 5.

With the document server 1, when receiving the access request data 4D and the image data on the call marker 61, the marker information selection portion 104 selects information on the call marker 61 in the following manner.

The marker information selection portion 104 extracts a path corresponding to the received call marker 61 from the call marker storage portion 102 (see FIG. 7). The marker information selection portion 104 then selects, as the marker name of the call marker 61, the right-most character string of elements sectioned by "/" (slash mark) of the extracted path. The marker information selection portion 104 then selects a part other than the marker name in the extracted path as the directory name of a directory where attribute data 4B (see FIG. 8) corresponding to the call marker 61 is stored.

The singular/plural content determination portion 105 determines whether or not there is a plurality of pieces of content 5 corresponding to the call marker 61 sent by the terminal 2 in the following manner.

The singular/plural content determination portion 105 reads out, from the content information storage portion 103, attribute data 4B having, as the data name, the marker name selected by the marker information selection portion 104 in the directory having the directory name selected by the marker information selection portion 104.

If the attribute data 4B thus read out has the number of content pieces of "2" or greater, then the singular/plural content determination portion 105 determines that there is a plurality of pieces of the content 5. On the other hand, if the attribute data 4B thus read out has the number of content pieces of "1", then the singular/plural content determination portion 105 determines that the number of pieces of the content 5 is not plural.

The content-to-be-sent determination portion 106 determines the content 5 to be sent to the terminal 2 (hereinafter, referred to as a "transmission target content") in the manner as depicted in FIG. 10.

If the singular/plural content determination portion 105 determines that there is a plurality of pieces of the content 5 corresponding to the call marker 61 (YES in Step #701), then the content-to-be-sent determination portion 106 reads the content table 4C (see FIG. 9) for the call marker 61 from the content information storage portion 103 (Step #702). In order to identify the content table 4C, the attribute data 4B corresponding to the information obtained by the marker information selection portion 104 is read out, and the table storage destination and the content table name indicated in the attribute data 4B are preferably referred to.

If the content table 4C has one or more records 4Ca showing the transmission status of "unsent" (YES in Step #703), then the content-to-be-sent determination portion 106 determines that the transmission target content is the content 5 shown in the top record 4Ca of the records 4Ca, namely, the record 4Ca having the smallest content number (Step #704).

On the other hand, if the content table 4C has no records 4Ca showing the transmission status of "unsent" (NO in Step #703), then the content-to-be-sent determination portion 106 determines that the transmission target content is content 5 shown in any of the records 4Ca stored in the content table 4C (Step #705). For example, the content-to-be-sent determination portion 106 determines that the transmission target content is the content 5 shown in the record 4Ca having the output destination of NULL (blank). Alternatively, the content-to-be-sent determination portion 106 determines that the transmission target content is the content 5 shown in the record 4Ca having the content number of "1".

Further, the content-to-be-sent determination portion 106 updates (Step #706) the message of the record 4Ca corresponding to the content 5 determined in Step #704 or Step #705 in the following manner.

The content-to-be-sent determination portion 106 calculates the number of records 4Ca having the value of transmission status of "unsent" among the records 4Ca stored in the content table 4C. For the calculation, however, the record 4Ca for the content 5 determined in Step #704 or Step #705 is excluded. The content-to-be-sent determination portion 106 then writes, in the message of the record 4Ca, a character string including the number added to a predetermined character string (for example, "residual AR content").

On the other hand, if the singular/plural content determination portion 105 determines that the number of pieces of the content 5 corresponding to the call marker 61 is not a plural number, namely, 1 (one) (NO in Step #701), then the content-to-be-sent determination portion 106 determines that the transmission target content is that one content piece 5 (Step #707). In such a case, the content table 4C for the call marker 61 sent by the terminal 2 has only one record 4Ca for the content 5. Therefore, the content 5 can be identified based on the record 4Ca.

Referring back to FIG. 6, the content data transmission portion 107 sends, to the terminal 2 which has sent the access request data 4D, data used for displaying the content 5 determined to be the transmission target content by the content-to-be-sent determination portion 106 in the following manner.

The content data transmission portion 107 generates a rectangular white image 59 having a predetermined size as shown in FIG. 11A. The content data transmission portion 107 reads out image data 4A on the content 5 from the call marker storage portion 102. The content data transmission portion 107 puts, as the main content 591, an image shown in the image data 4A onto the image 59, as shown in FIG. 11B. The image data 4A is identifiable based on the content data name indicated in the record 4Ca for the content 5 and the content data storage destination indicated in the attribute data 4B for the call marker 61 sent by the terminal 2.

If the singular/plural content determination portion 105 determines that there is a plurality of pieces of the content 5 corresponding to the call marker 61, then the content data transmission portion 107 places the next object (text object), as sub-content 592-594, onto the image 59.

The content data transmission portion 107 puts, onto the image 59, a text object (character string) showing the content number, a text object showing the content name, and a text object showing the message indicated in the record 4Ca for the content 5 respectively, as the sub-content 592, the sub-content 593, and the sub-content 594.

The main content 591 and the sub-content 592-594 are put in the individual predetermined positions of the image 59.

As discussed above, one or more objects are put in the image 59, so that image data 4E on the entirety of the content 5 is generated. The content data transmission portion 107 then sends the image data 4E to the terminal 2 which has sent the access request data 4D.

With the terminal 2, when receiving the image data 4E from the document server 1, the content display processing portion 202 displays the content 5 in the touch-sensitive panel display 20e in the following manner.

The content display processing portion 202 detects the position of the call marker 61 in the image (image on the printed matter 6) which is photographed by the digital camera 20g and displayed in the touch-sensitive panel display 20e. The content display processing portion 202 then superimposes the content 5 at a predetermined position on the photographed image with respect to the position of the call marker 61, and displays the resultant.

With the document server 1, when the content data transmission portion 107 sends the image data 4E on the content 5 to the terminal 2, the attribute data updating portion 108 updates the record 4Ca for the content 5 in the following manner.

The attribute data updating portion 108 updates a value of the output destination of the record 4Ca with the identifier of the terminal 2. If the transmission status shows "unsent", then the attribute data updating portion 108 updates "unsent" with "sent".

With the terminal 2, when the user enters a command to finish displaying the content 5, the content display processing portion 202 finishes displaying the content 5.

In response to the command entered, the display end notifying portion 203 sends end notifying data 4F to the document server 1.

The attribute data updating portion 108 of the document server 1 updates the record 4Ca in the following manner.

The attribute data updating portion 108 searches for a record 4Ca indicating the identifier of the terminal 2 which has sent the end notifying data 4F. The attribute data updating portion 108 then resets values of the output destination and the message indicated in the record 4Ca. In short, the attribute data updating portion 108 updates the values thereof with "NULL".

Immediately after output destinations of all records 4Ca stored in a content table 4C are reset, or, alternatively, after a predetermined lapse of time, the attribute data updating portion 108 may reset a transmission status indicated in each of the records 4Ca to "unsent".

Figure 12:
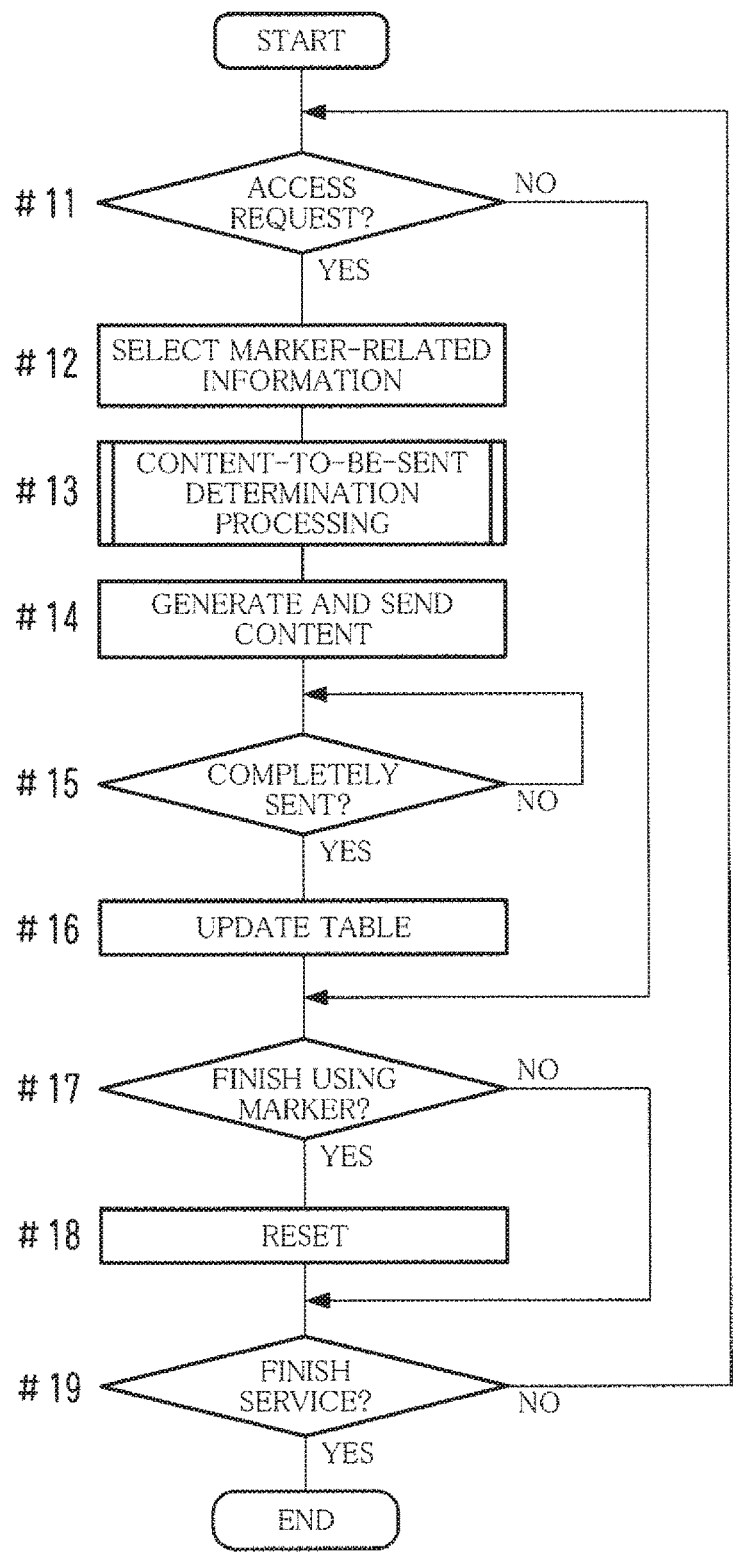
FIG. 12 is a flowchart depicting an example of the flow of the entire processing by a document server.

FIG. 12 is a flowchart depicting an example of the flow of the entire processing by the document server 1.

The description goes on to the flow of the entire processing performed when the document server 1 provides the content 5. The description is provided with reference to the flowchart.

The document server 1 executes the processing depicted in FIG. 12 based on the document providing program 10P.

The document server 1 receives, from the terminal 2, the access request data 4D and image data on the call marker 61 (Yes in Step #11 of FIG. 12). The document server 1 selects information on the call marker 61 (Step #12). The document server 1 determines content 5 to be sent to the terminal 2 (transmission target content) (Step #13). The method for determination is the same as that discussed earlier with reference to FIG. 10.

The document server 1 then generates image data 4E on the transmission target content (see FIG. 11) to send the image data 4E to the terminal 2 (Step #14).

When the image data 4E is sent completely (YES in Step #15), the document server 1 updates the output destination of the record 4Ca for the transmission target content to indicate the identifier of the terminal 2, and changes, if the value of "unsent" is indicated in the transmission status, "unsent" to "sent" (Step #16).

When receiving the end notifying data 4F from the terminal 2 (YES in Step #17), the document server 1 resets the output destination and the message indicated in the record 4Ca for the content 5 displayed in the terminal 2 (Step #18).

While providing document delivery service, the document server 1 executes the processing from Step #11 through Step #16 and the processing from Step #17 through Step #18 appropriately.

Specific Example_1 for Providing Content 5 to Terminals 2

FIGS. 13(A) through 13(C) are transition diagrams showing the content table 4C.

According to the foregoing mechanism, the user uses each of the terminals 2 to photograph the printed matter 6, so that content 5 different from each other is displayed in the terminals 2. The description is provided below by taking an example in which the printed matter 6 of FIG. 4 is used to display three pieces of the content 501, 502, and 503 illustrated in FIGS. 5A-5C in the terminals 2A, 2B, and 2C.

One user may possess the terminals 2A, 2B, and 2C to perform the operation discussed below. Alternatively, three users may possess the terminals 2A, 2B, and 2C respectively, and get together at a place to perform the operation discussed below. The latter case is described hereinafter.

Each value in each field of records 4Ca for the pieces of content 5 is an initial value as shown in FIG. 9.

At first, the first user uses the terminal 2A to take an image of the printed matter 6. The terminal 2A detects the call marker 61 in the image of the printed matter 6 to extract the call marker 61. The terminal 2A sends the access request data 4D and image data on the call marker 61 to the document server 1.

When receiving the access request data 4D and the image data, the document server 1 selects information on the call marker 61 to determine transmission target content to be sent to the terminal 2A by using the method depicted in FIG. 10. As shown in FIG. 9, none of the three pieces of content have yet been sent. The document server 1 thus determines that the transmission target content is content 5 corresponding to a content number of "No. 1".

The document server 1 generates image data 4E used for displaying the content 5 by using the method as shown in FIG. 11, and sends the image data 4E to the terminal 2A.

The terminal 2A receives the image data 4E to display the content 5. Thereby, the content 501 is displayed as shown in FIG. 5A.

The document server 1 updates the record 4Ca for the content 5 as shown in FIG. 13(A).

Next, the second user uses the terminal 2B to take an image of the printed matter 6. The terminal 2B detects the call marker 61 in the image of the printed matter 6 to extract the call marker 61. The terminal 2B sends the access request data 4D and image data on the call marker 61 to the document server 1.

When receiving the access request data 4D and the image data, the document server 1 determines transmission target content to be sent to the terminal 2B in a manner similar to that for the case where the document server 1 receives the data from the terminal 2A. However, as shown in FIG. 13(A), the first piece of content 5 has been already sent, and the second piece of content 5 and onward have not yet been sent. The document server 1 thus determines that the transmission target content is content 5 corresponding to a content number of "No. 2".

The document server 1 generates image data 4E used for displaying the content 5 by using the method as shown in FIG. 11, and sends the image data 4E to the terminal 2B.

The terminal 2B receives the image data 4E to display the content 5. Thereby, the content 502 is displayed as shown in FIG. 5B.

The document server 1 updates the record 4Ca for the content 5 as shown in FIG. 13(B).

At last, the third user uses the terminal 2C to take an image of the printed matter 6. The terminal 2C detects the call marker 61 in the image of the printed matter 6 to extract the call marker 61. The terminal 2C sends the access request data 4D and image data on the call marker 61 to the document server 1.

When receiving the access request data 4D and the image data, the document server 1 determines transmission target content to be sent to the terminal 2C in a manner similar to that for the case where the document server 1 receives the data from the terminal 2A. However, as shown in FIG. 13(B), the first and second pieces of content 5 have been already sent, and the third piece of content 5 has not yet been sent. The document server 1 thus determines that the transmission target content is content 5 corresponding to a content number of "No. 3".

The document server 1 generates image data 4E used for displaying the content 5 by using the method as shown in FIG. 11, and sends the image data 4E to the terminal 2C.

The terminal 2C receives the image data 4E to display the content 5. Thereby, the content 503 is displayed as shown in FIG. 5C.

The document server 1 updates the record 4Ca for the content 5 as shown in FIG. 13(C).

The three users then place the terminals 2A-2C side by side so that they share their ideas/opinions while comparing the content pieces 501, 502, and 503 displayed in the terminals 2A, 2B, and 2C respectively.

In the first embodiment, a plurality of pieces of content 5 made to correspond to a call marker 61 is sent to the terminals 2 in order from a piece of the content 5 which has not yet been sent to each of the terminals 2. It is therefore possible to provide a plurality of pieces of content 5 in such a manner that a user compares between the pieces of content more easily than is conventionally possible.

Second Embodiment

Figure 14A:
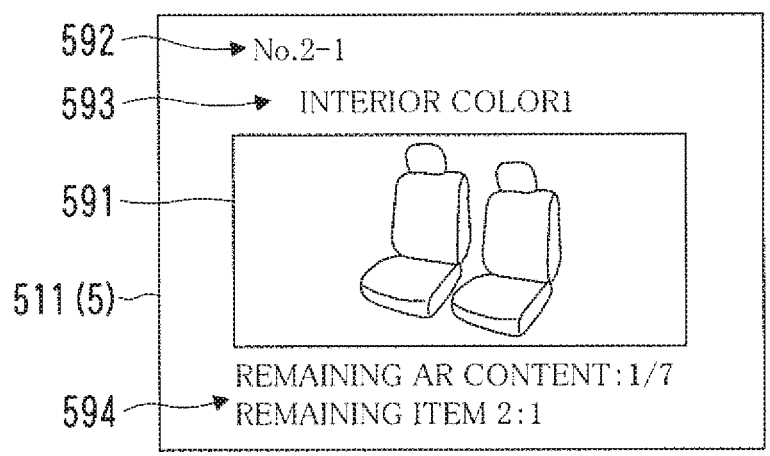
FIGS. 14A through 14D are diagrams showing an example of content.
Figure 14B:
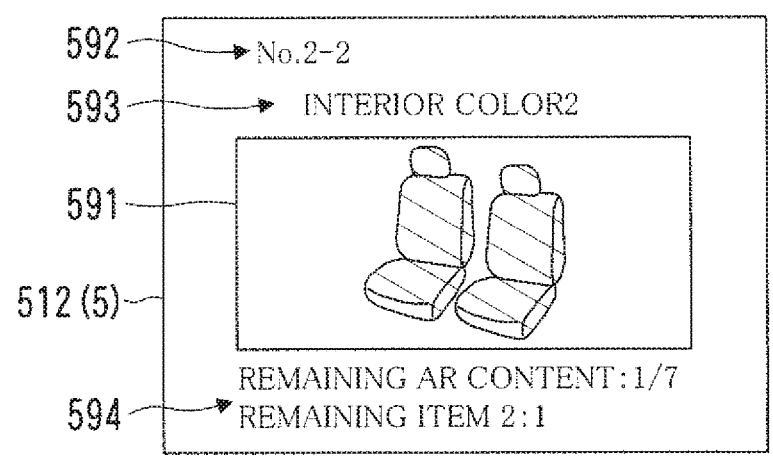
Figure 14C:
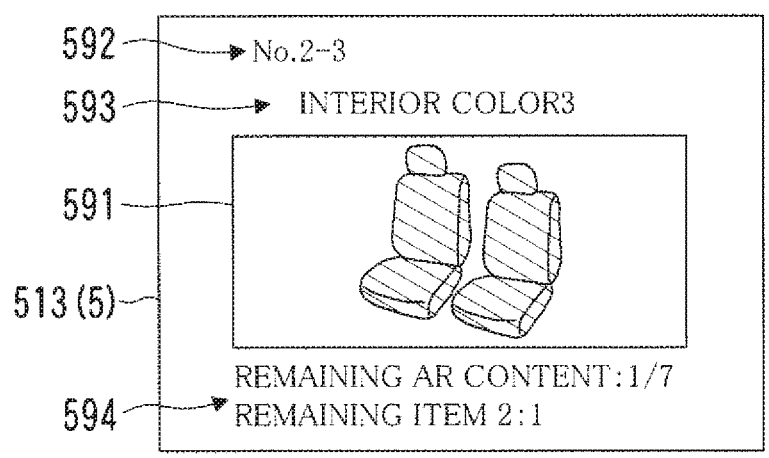
Figure 14D:
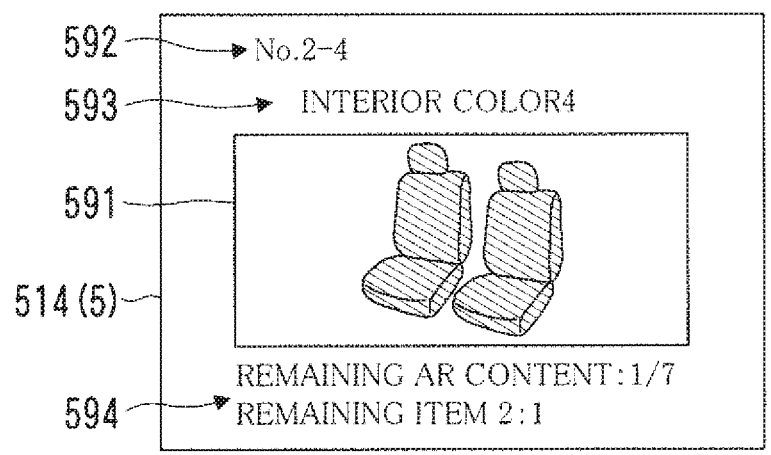
Figure 15:
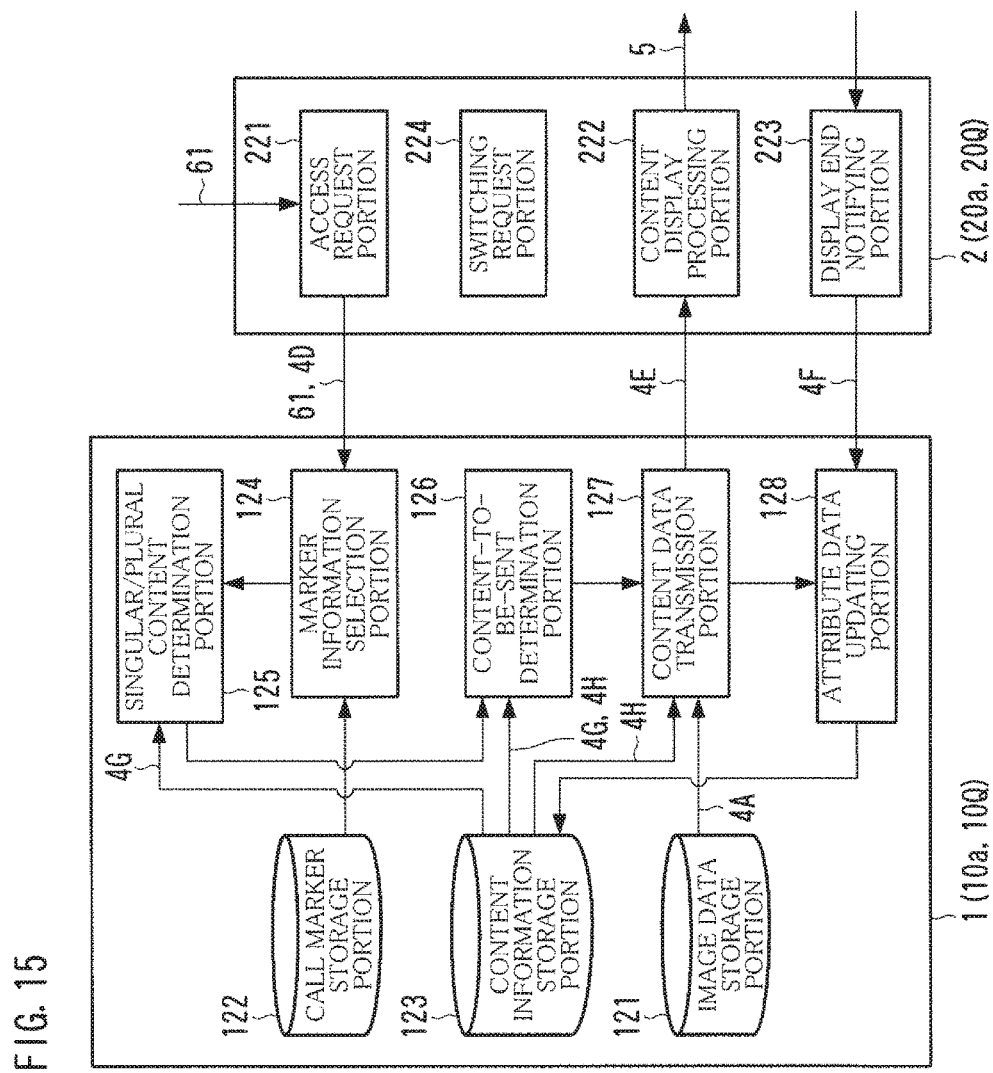
FIG. 15 is a diagram showing an example of the functional configuration of a document server and the functional configuration of a terminal.

FIGS. 14A through 14D are diagrams showing an example of content 511 through content 514. FIG. 15 is a diagram showing an example of the functional configuration of the document server 1 and the functional configuration of the terminal 2.

In the first embodiment, the document server 1 provides, as content 5 corresponding to one call marker 61, only content 5 related to one item (item named body color, for example).

According to the second embodiment, the document server 1 provides, as content 5 corresponding to one call marker 61, content 5 related to each of items. For example, the document server 1 provides, as content 5 corresponding to one call marker 61, three pieces of the content 501, 502, and 503 related to body color shown in FIGS. 5A through 5C, and four pieces of the content 511, 512, 513, and 514 related to interior color shown in FIGS. 14A through 14C.

Further, in the second embodiment, when operation for switching between content pieces 5 is performed in one of the terminals 2, content pieces 5 are switched also in the other terminals 2. Stated differently, switching between content pieces 5 in one of the terminals 2 links with switching therebetween also in the other terminals 2.

In the second embodiment, the overall configuration of the document viewing system 100 is similar to that shown in FIG. 1 of the first embodiment. The hardware configuration of the document server 1 and the hardware configuration of the terminal 2 are similar to those shown in FIGS. 2 and 3 of the first embodiment.

However, the ROM 10c or the large-capacity storage 10d of the document server 1 stores therein a document providing program 10Q instead of the document providing program 10P.

The ROM 20c or the flash memory 20d of the terminal 2 stores therein a document viewing program 20Q instead of the document viewing program 20P.

The document providing program 10Q implements, in the document server 1, an image data storage portion 121, a call marker storage portion 122, a content information storage portion 123, a marker information selection portion 124, a singular/plural content determination portion 125, a content-to-be-sent determination portion 126, a content data transmission portion 127, an attribute data updating portion 128, and so on, all of which are shown in FIG. 15.

The document viewing program 20Q implements, in the terminal 2, an access request portion 221, a content display processing portion 222, a display end notifying portion 223, a switching request portion 224, and so on.

The description goes on to the individual portions of the document server 1 and the terminal 2 shown in FIG. 15. Description of points common to the first embodiment shall be omitted.

[Data]

FIG. 16 is a diagram showing an example of attribute data 4G. FIG. 17 is a diagram showing an example of a content table. 4H As with the image data storage portion 101 (see FIG. 6), the image data storage portion 121 stores, therein, image data 4A showing the main content 591 of the content 5 for each call marker 61.

As with the call marker storage portion 102 of the first embodiment, the call marker storage portion 122 stores, therein, a path corresponding to each of the call markers 61 (see FIG. 7).

As with the content information storage portion 103 of the first embodiment, the content information storage portion 123 stores, therein, the attribute data 4B (see FIG. 8) and the content table 4C (see FIG. 9).

However, if the call marker 61 corresponds to content 5 of each of the items, attribute data 4G rather than the attribute data 4B is stored as the attribute data on the call marker 61. The attribute data 4G has a structure as shown in FIG. 16.

The attribute data 4G indicates marker information and content information, as with the attribute data 4B.

The content information of the attribute data 4G has the total number of content pieces instead of the number of content pieces. The total number of content pieces is the total of pieces of content 5 for all items corresponding to the call marker 61. For example, when the call marker 61 corresponds to three pieces of content 5 for the body color and four pieces of content 5 for the interior color, the total number of content pieces is "7".

The content information also has the number of items and the number of content pieces_1 through the number of content pieces_N. The "number of items" is the number of items corresponding to the call marker 61. The letter "N" shows the number of items. The "number of content pieces_k" is the number of pieces of content 5 having an item number of "k". The attribute data 4G of FIG. 16 is an example where the number of items is "2".

In the case where the call marker 61 corresponds to content 5 of each of the items, the content table 4H is stored as a content table for the call marker 6 instead of the content table 4C. The content table 4H is structured as shown in FIG. 17.

The content table 4H stores a record 4Ha for each piece of content 5. In the first embodiment, the pieces of content 5 are distinguished from one another based on only the content number of the record 4Ca. The record 4Ha, however, indicates the item number and the content number. The pieces of content 5 are distinguished from one another based on the item number and the content number.

In the content table 4H, the "item number" is the sequence number of an item to which the content 5 for the record 4Ha belongs. The "content number" is the sequence number of the content 5 in the corresponding item.

The other information indicated in the record 4Ha is the same as that in the record 4Ca, which is described in the first embodiment.

The content information storage portion 123 stores, therein, a linking mode flag 4J for each call marker 61.

The linking mode flag 4J shows an operation mode for the case where the content 5 for the call marker 61 is changed in response to a gesture made by the user.

In the case where the operation mode is a "linking mode", the linking mode flag 4J is turned "ON". The "linking mode" is a mode in which, in synchronism with switching between content pieces 5 in one of the terminals 2, content pieces 5 are switched also in the other terminals 2.

On the other hand, in the case where the operation mode is an "independent mode", the linking mode flag 4J is turned "OFF". The "independent mode" is a mode in which switching between content pieces 5 in one of the terminals 2 does not influence on any of the other terminals 2.

The initial value of the linking mode flag 4J is "ON". The user is allowed to change the value of the linking mode flag 4J appropriately.

[Processing for Providing Content 5 in Connection with Photographing of Call Marker 61]

Figure 18:
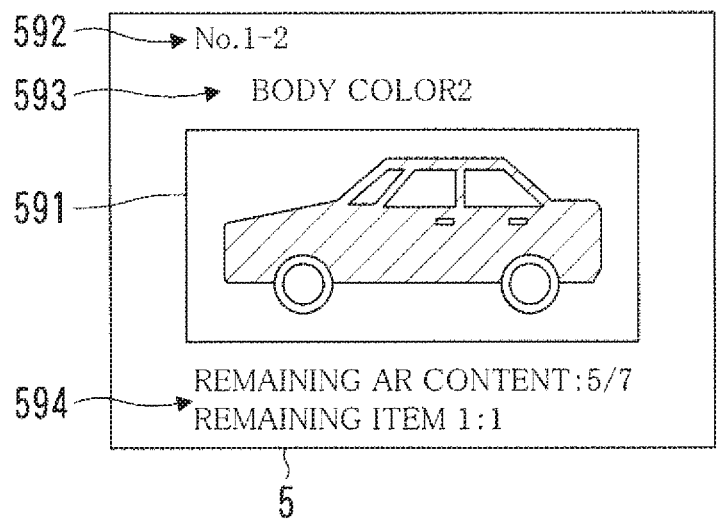
FIG. 18 is a diagram showing an example of content.

FIG. 18 is a diagram showing an example of content 5.

The user uses his/her terminal 2 to start the document viewing program 20Q. In response to the operation, the access request portion 221 takes an image of the call marker 61 by the digital camera 20g, and sends the access request data 4D and image data on the call marker 61 to the document server 1, as with the access request portion 201 of the first embodiment. Thereby, the access request portion 221 makes a request to access the content 5.

With the document server 1, when receiving the access request data 4D and the image data on the call marker 61, the marker information selection portion 124 selects a marker name of the call marker 61 and a directory name of a directory where the content table 4H is stored. The method for selecting is the same as that for selecting a marker name and directory name by the marker information selection portion 104 of the first embodiment.

The singular/plural content determination portion 125 determines whether or not there is a plurality of pieces of content 5 corresponding to the call marker 61 sent by the terminal 2. The method for determination is similar to that by the singular/plural content determination portion 105 of the first embodiment. However, if the call marker 61 corresponds to a plurality of items, then a content table 4H (see FIG. 17) is used instead of the content table 4C.

The content-to-be-sent determination portion 126 determines a transmission target content (content 5 to be sent to the terminal 2) as with the content-to-be-sent determination portion 106 of the first embodiment.

When the call marker 61 and the access request data 4D are sent from the terminal 2, the content-to-be-sent determination portion 126 determines the transmission target content basically in the same manner as that in the first embodiment.

To be specific, in response to the image data on call marker 61 and the access request data 4D received, the content-to-be-sent determination portion 126 determines that the transmission target content is the content 5 listed at the top of unsent content pieces 5 corresponding to the call marker 61. The smaller item number the content 5 has, the upper order the content 5 is listed. When there is a plurality of pieces of unsent content 5 in one item, the content having smaller content number is listed at upper order.

The content-to-be-sent determination portion 126 generates, as the sub-content 592 (see FIG. 11C), a text object of an item number and a content number indicated in the record 4Ha for the transmission target content as shown in FIG. 18. The text "No. 1-2" means that the item number is "1" and the content number is "2".

The content-to-be-sent determination portion 126 further generates, as the sub-content 594, a text object (character string) of the total number of content pieces indicated in the attribute data 4G for the call marker 61, the number of pieces of unsent content 5 corresponding to any item, and the number of pieces of unsent content 5 corresponding to an item to which the transmission target content belongs. The text "5/7" means that the number of pieces of unsent content 5 corresponding to any item is "5" and the total number of content pieces indicated in the attribute data 4G is "7".

The sub-content 594 is stored in the message field of the record 4Ha for the transmission target content.

In the second embodiment, the content-to-be-sent determination portion 126 determines a transmission target content also for the case where item change request data 4K or content change request data 4L described later is sent by the terminal 2. This will be described later.

The content data transmission portion 127 generates image data 4E used for displaying the content 5 which is determined to be the transmission target content by the content-to-be-sent determination portion 126, and sends the image data 4E to the terminal 2 which has sent the access request data 4D. The method for generating the image data 4E is similar to that in the first embodiment, which is described earlier with reference to FIG. 11.

However, when the image data 4E is generated in association with the item change request data 4K or the content change request data 4L, the content data transmission portion 127 sends the image data 4E to the terminal 2 which has sent the item change request data 4K or the content change request data 4L. In some cases, the image data 4E is generated and sent for another terminal 2. This will be described later.

When the image data 4E for the content 5 is sent to the terminal 2, the attribute data updating portion 128 updates the record 4Ha for the content 5. The method for updating the record 4Ha is similar to that for updating the record 4Ca in the first embodiment.

As with the content display processing portion 202 of the first embodiment, when the terminal 2 receives the image data 4E from the document server 1, the content display processing portion 222 displays the content 5 in the touch-sensitive panel display 20e.

As with the content display processing portion 202 of the first embodiment, when the user enters a command to finish displaying the content 5, the content display processing portion 222 finishes displaying the content 5.

As with the display end notifying portion 203 of the first embodiment, the display end notifying portion 223 sends the end notifying data 4F to the document server 1.

The attribute data updating portion 128 of the document server 1 updates (resets) the record 4Ha. The method for updating is similar to that for updating the record 4Ca in the first embodiment.

[Processing for Providing Content 5 in Accordance with Gesture Made by User]

Figure 19:
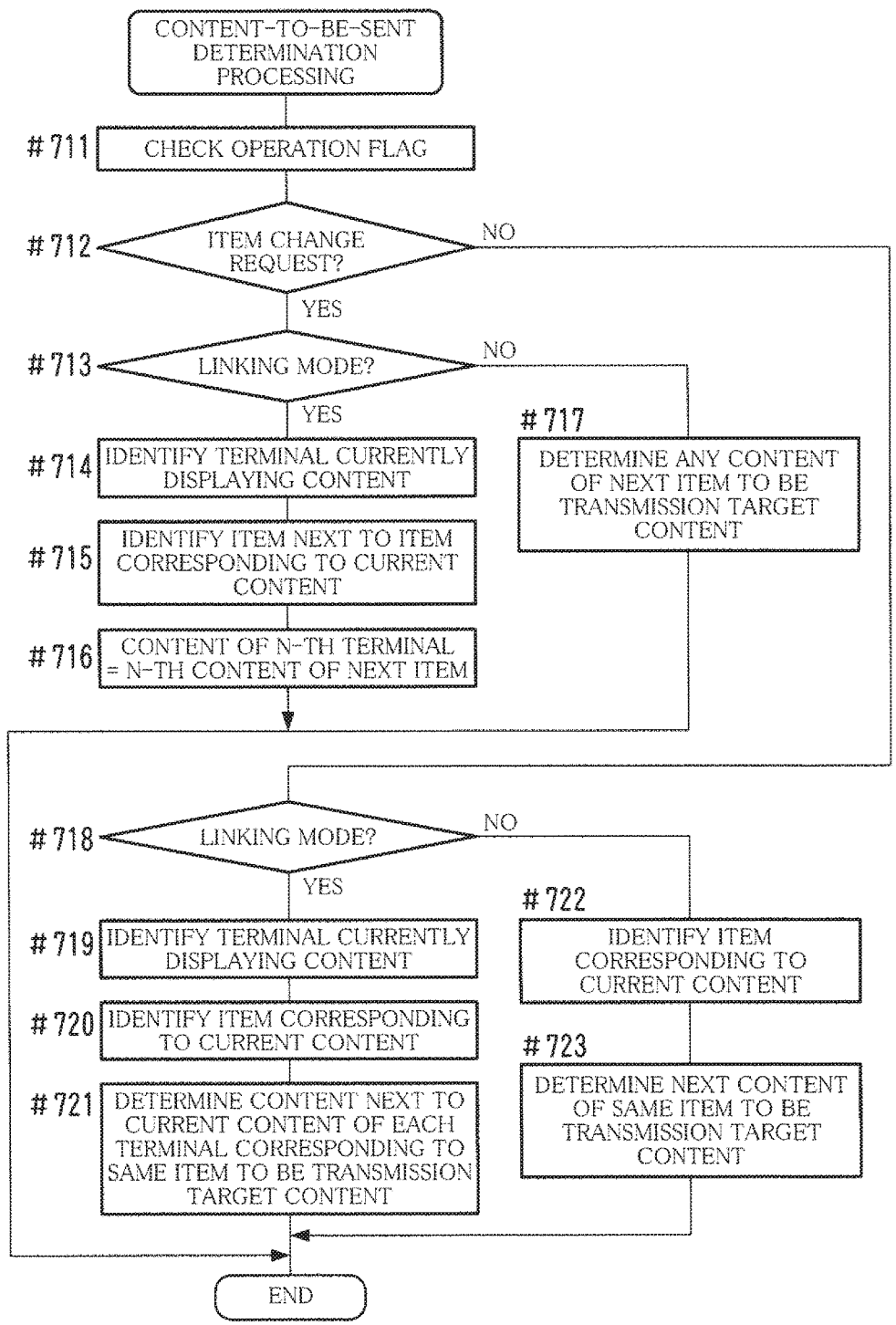
FIG. 19 is a flowchart depicting an example of the flow of second content determination processing.

FIG. 19 is a flowchart depicting an example of the flow of second content determination processing.

While content 5 appears in the touch-sensitive panel display 20e of the terminal 2, the user swipes his/her finger on the touch-sensitive panel display 20e to display another piece of content 5. The mechanism thereof is described below. The content 5 currently appearing in the touch-sensitive panel display 20e is referred to as "current content".

In order to display another piece of content 5, the user makes a gesture on the touch-sensitive panel display 20e in the following manner.

In order to display content 5 corresponding to an item other than the item of the current content, the user swipes his/her finger horizontally (left or right) across the touch-sensitive panel display 20e. In order to display content 5 which corresponds to the same item as that of the current content and is next to the current content, the user swipes his/her finger vertically (up or down) along the surface of the touch-sensitive panel display 20e.

In response to the horizontal swipe by the user, the switching request portion 224 sends the item change request data 4K to the document server 1. On the other hand, in response to the vertical swipe by the user, the switching request portion 224 sends the content change request data 4L to the document server 1. In either case, the call marker 61 photographed by the digital camera 20g is sent to the document server 1.

With the document server 1, when receiving the item change request data 4K or the content change request data 4L from the terminal 2, the content-to-be-sent determination portion 126 determines transmission target content to be sent to the terminal 2 in the manner as depicted in FIG. 19.

The content-to-be-sent determination portion 126 checks a value of the linking mode flag 4J corresponding to the call marker 61 received together with the item change request data 4K or the content change request data 4L (Step #711).

The document server 1 receives the item change request data 4K (YES in Step #712). When the linking mode flag 4J has a value of "ON", i.e., when the operation mode is the linking mode (YES in Step #713), the content-to-be-sent determination portion 126 identifies (Step #714) the terminals 2 which currently display content 5 corresponding to the call marker 61 based on the content table 4H (see FIG. 17) for the call marker 61 received together with the item change request data 4K. Each of the terminals 2 currently displaying the content 5 is a terminal 2 whose identifier is indicated in the output destination of any of the records 4Ha in the content table 4H.

The content-to-be-sent determination portion 126 further identifies (Step #715), based on the content table 4H, an item next to the item corresponding to the current content in the terminal 2 which has sent the item change request data 4K. Hereinafter, such an item next to the item is referred to as a "next item" simply. If the item corresponding to the current content is the last item (item having the greatest item number), an item having an item number of "1" is regarded as the next item.

The content-to-be-sent determination portion 126 then determines that the transmission target content to be sent to each of the terminals 2 identified in Step #714 is any one piece of content 5 corresponding to the next item (Step #716). In other words, the content-to-be-sent determination portion 126 assigns, for each of the terminals 2, any one piece of the content 5 corresponding to the next item as the transmission target content.

At this time, however, one piece of content 5 is not assigned in common to the terminals 2. It is preferable to assign pieces of content 5 which having successive content numbers, in order, to the terminals 2. For example, it is preferable to make a record of time at which each of the terminals 2 has sent the access request data 4D to the document server 1, and to assign the content pieces 5 having a content number of "1", "2", "3", . . . and so on to the terminals 2, in order, from the terminal 2 which has sent the access request data 4D earlier. Alternatively, it is also possible to assign unsent content pieces 5 to the terminals 2, in order, from the unsent content 5 having a smaller content number.

When the linking mode flag 4J has a value of "OFF", i.e., when the operation mode is the independent mode (NO in Step #713), the content-to-be-sent determination portion 126 determines that the transmission target content to be sent to the terminal 2 which has sent the item change request data 4K is any content 5 corresponding to the next item (Step #717). For example, among unsent content 5 corresponding to the next item, content having the smallest content number may be determined to be the transmission target content. Alternatively, content having a content number of "1" may be determined to be the transmission target content. The transmission target content to be sent to the other terminals 2 is not determined.

On the other hand, when the document server 1 receives the content change request data 4L (NO in Step #712), and when the linking mode flag 4J has a value of "ON" (YES in Step #718), the content-to-be-sent determination portion 126 identifies (Step #719) the terminals 2 which currently display content 5 corresponding to the call marker 61 based on the content table 4H for the call marker 61 received together with the content change request data 4L.

The content-to-be-sent determination portion 126 further identifies (Step #720), based on the content table 4H, an item corresponding to the current content in the terminal 2 which has sent the content change request data 4L. The content-to-be-sent determination portion 126 then determines (Step #721), based on the content table 4H, that the transmission target content to be sent to each of the identified terminals 2 is content 5 next to the current content corresponding to the identified item. If the current content is the last content 5 (content having the greatest content number), content having a content number of "1" is regarded as the next content.

It is supposed that, for example: the item identified has an item number of "2"; the terminals 2 identified are the terminals 2A, 2B, and 2C; and the current content in each of the terminals 2A, 2B, and 2C is content 5 which has an item number of "2" and content number of "1", "2", and "3", respectively. In such a case, the transmission target content to be sent to each of the identified terminals 2A, 2B, and 2C is content 5 which has an item number of "2" and content number of "2", "3", and "4", respectively.

When the linking mode flag 4J has a value of "OFF", i.e., when the operation mode is the independent mode (NO in Step #718), the content-to-be-sent determination portion 126 identifies an item corresponding to the current content in the terminal 2 which has sent the content change request data 4L (Step #722). The content-to-be-sent determination portion 126 then determines that the transmission target content to be sent to the terminal 2 is content 5 next to the current content in the terminal 2 in the item identified (Step #723). The transmission target content to be sent to the other terminals 2 is not determined.

Referring back to FIG. 15, the content data transmission portion 127 generates image data 4E on the content 5 determined to be the transmission target content by the content-to-be-sent determination portion 126, and sends the image data 4E to the corresponding terminal 2. The method for generating the image data 4E is the same as that described earlier with reference to FIG. 11.

The attribute data updating portion 128 updates the record 4Ha for the content 5 in response to the image data 4E on the content 5 sent. The method for updating is similar to that for updating the record 4Ca in the first embodiment.

With the terminal 2, when receiving the image data 4E from the document server 1, the content display processing portion 222 stops displaying the content 5 currently displayed, and displays new content 5 in the touch-sensitive panel display 20e based on the image data 4E. In the linking mode, the processing is performed also in the terminals 2 other than the terminal 2 which has sent the item change request data 4K or the content change request data 4L.

FIG. 20 is a flowchart depicting an example of the flow of the entire processing by the document server 1.

The description goes on to the flow of the entire processing performed when the document server 1 provides the content 5 in the second embodiment. The description is provided with reference to the flowchart.

The document server 1 executes the processing depicted in FIG. 20 based on the document providing program 10Q.

The document server 1 receives, from the terminal 2, the access request data 4D (Yes in Step #21 of FIG. 20). As with the first embodiment, the document server 1 sends, to the terminal 2, first, image data 4E on the content 5 which has not yet been sent and has a record 4Ha stored in the upper order of the content table 4H (Step #22 through Step #26). The specific processing is the same as that depicted in Step #12 through Step #16 of FIG. 12.

When receiving, from the terminal 2, the item change request data 4K or the content change request data 4L (YES in Step #27), the document server 1 determines the transmission target content (Step #28), generates image data 4E on the transmission target content to send the image data 4E to the terminal 2 (Step #29).

The method for determination is the same as that discussed earlier with reference to FIG. 19. According to the method, in the linking mode, the document server 1 determines transmission target content to be sent to other terminals 2 which have ever sent the access request data 4D together with the same call marker 61 as that photographed by the terminal 2. In Step #29, image data 4E on each piece of the transmission target content is generated and is sent to each of the terminals 2.

After the transmission (YES in Step #30), the document server 1 updates each of the records 4Ha for the pieces of content 5 sent (Step #31).

When receiving the end notifying data 4F from the terminal 2 (YES in Step #32), the document server 1 resets the output destination and the message indicated in the record 4Ha for the content 5 displayed in the terminal 2 (Step #33), as with Step #18 in the first embodiment.

While providing document delivery service, the document server 1 executes the processing from Step #21 through Step #26, the processing from Step #27 through Step #31, and the processing from Step #32 through Step #33 appropriately.

Specific Example_2 for Providing Content 5 to Terminals 2

FIGS. 21, 22, and 23 are diagrams showing examples of the content table 4H.

According to the foregoing mechanism, the user uses the terminals 2 to view a plurality of pieces of content 5 for an item. According to the mechanism, one-time operation enables a plurality of pieces of content 5 in the terminals 2 to be changed to different pieces of content 5 collectively.

The description is provided below by taking an example in which, when the content 501, 502, and 503 (see FIG. 5) appear, as three pieces of content 5 for body color, in the three terminals 2A, 2B, and 2C respectively, the content 501, 502, and 503 are changed to the content 511, 512, and 513 (see FIG. 14) as the content 5 for interior color. In this example, one call marker 61 is made to correspond to content 5 for a plurality of items. The example is thus different from the first embodiment in character string of the sub-content 592 and character string in the sub-content 594 of each of the pieces of the content 501 through 503.

Before the content 501, 502, and 503 appear, each value in each field of records 4Ha for the pieces of content 5 is an initial value as shown in FIG. 17. After the content 501, 502, and 503 appear in the terminals 2A, 2B, and 2C respectively, the records 4Ha for the pieces of content 5 are updated as shown in FIG. 21.

The value of the linking mode flag 4J is "ON". In short, the document server 1 is placed in the linking mode.

The user swipes his/her finger horizontally across the touch-sensitive panel display 20e of any of the terminals 2. The description is provided by taking an example in which the user swipes his/her finger across the touch-sensitive panel display 20e of the terminal 2A.

In response to the horizontal swipe, the terminal 2A sends the item change request data 4K to the document server 1. At this time, the terminal 2A also sends, to the document server 1, image data on the call marker 61 photographed in obtaining the content 501.

The document server 1 then selects information on the call marker 61. The document server 1 uses the method depicted in FIG. 19 to find the terminal 2 currently displaying content 5 corresponding to the call marker 61 and determines transmission target content to be sent to each of the terminals 2.

According to the foregoing processing, in this example, the terminals 2A, 2B, and 2C are found out, so that the transmission target content to be sent to each of the terminals 2A, 2B, and 2C is determined. The transmission target content is determined in order starting from the content 5 having the smallest content number, namely, in order of the content 5 with the content number of "1", the content 5 with the content number of "2", and the content 5 with the content number of "3", because all the pieces of content 5 for the next item (interior color) are unsent.

The document server 1 generates image data 4E used for displaying each of the three pieces of content 5. The document server 1 then sends the first image data 4E, the second image data 4E, and the third image data 4E to the terminal 2A, the terminal 2B, and the terminal 2C, respectively.

Each of the terminals 2A, 2B, and 2C receives the image data 4E from the document server 1 to display the content 5. Thereby, the content 511 is displayed in the terminal 2A as shown in FIG. 14A. The content 512 is displayed in the terminal 2B as shown in FIG. 14B. The content 513 is displayed in the terminal 2C as shown in FIG. 14C.

The document server 1 updates each of the records 4Ca in accordance with the change as shown in FIG. 22.

Then, the user swipes his/her finger vertically along the touch-sensitive panel display 20e of any of the terminals 2. The description is provided by taking an example in which the user swipes his/her finger along the touch-sensitive panel display 20e of the terminal 2A.

In response to the vertical swipe, the terminal 2A sends the content change request data 4L to the document server 1. At this time, the terminal 2A also sends, to the document server 1, image data on the call marker 61 photographed in obtaining the content 501.

The document server 1 then selects information on the call marker 61. The document server 1 uses the method depicted in FIG. 19 to find the terminal 2 currently displaying content 5 corresponding to the call marker 61 and determines transmission target content to be sent to each of the terminals 2.

According to the foregoing processing, in this example, the terminals 2A, 2B, and 2C are found out, so that the transmission target content to be sent to each of the terminals 2A, 2B, and 2C is determined. Since the content change request data 4L is received this time, content 5 next to the content 5 for the current item (interior color) displayed in each of the terminals 2A, 2B, and 2C is determined as the transmission target content.

The document server 1 generates image data 4E used for displaying each of the three pieces of content 5. The document server 1 then sends the first image data 4E, the second image data 4E, and the third image data 4E to the terminal 2A, the terminal 2B, and the terminal 2C, respectively.

Each of the terminals 2A, 2B, and 2C receives the image data 4E from the document server 1 to display the content 5. Thereby, the content 512 is displayed in the terminal 2A as shown in FIG. 14B. The content 513 is displayed as shown in FIG. 14C. The content 514 is displayed in the terminal 2C as shown in FIG. 14D. In each piece of the content 5, a text object of "remaining AR content: 0/7; remaining item 2: 0" is incorporated as the sub-content 594.

The document server 1 updates each of the records 4Ca in accordance with the change as shown in FIG. 23.

In the second embodiment, even when a plurality of pieces of content 5 made to correspond to a call marker 61 is classified into a plurality of items, it is possible to provide a plurality of pieces of content 5 in such a manner that a user compares between the pieces of content more easily than is conventionally possible.

Third Embodiment

Figure 24:
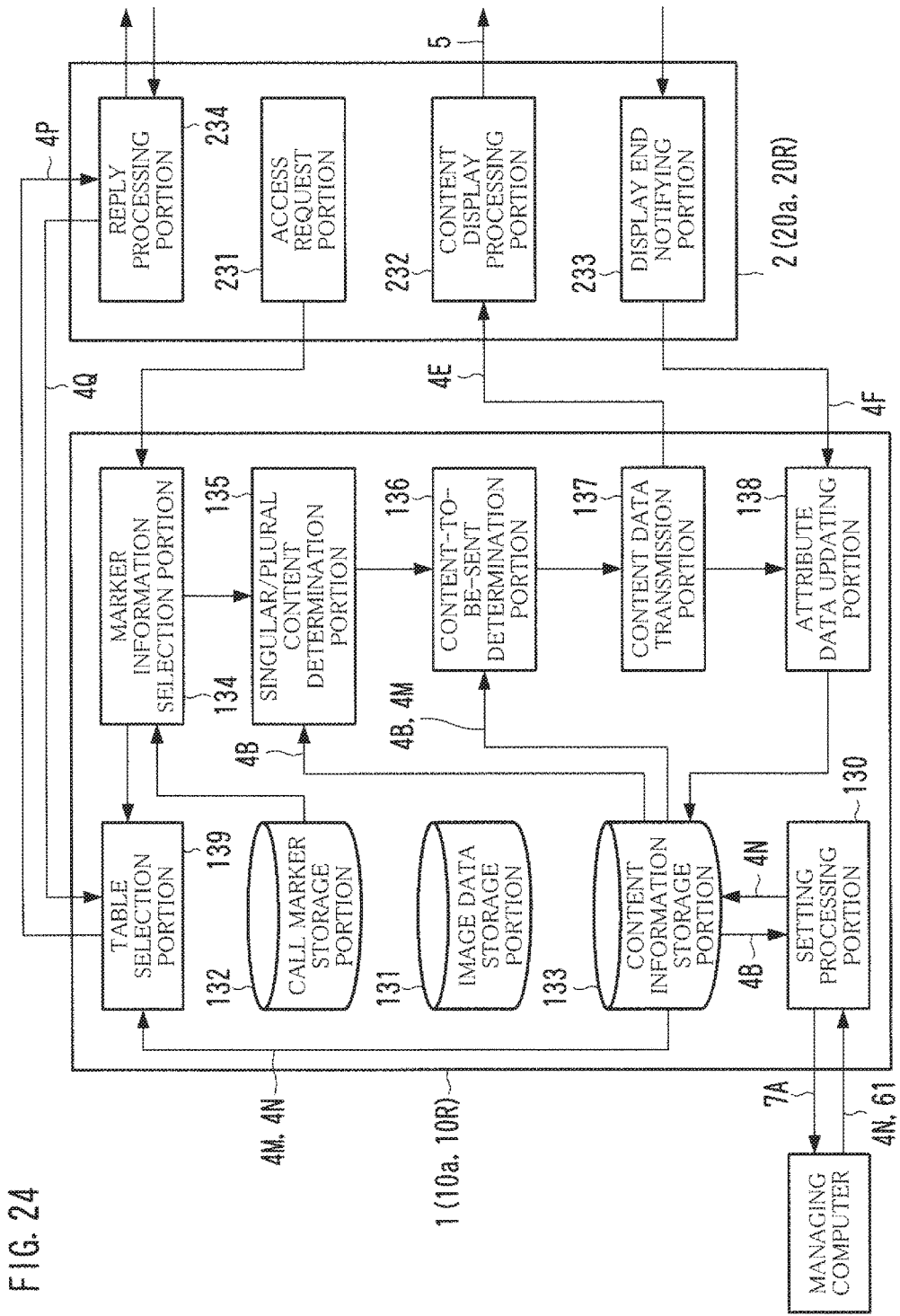
FIG. 24 is a diagram showing an example of the functional configuration of a document server and the functional configuration of a terminal.

FIG. 24 is a diagram showing an example of the functional configuration of the document server 1 and the functional configuration of the terminal 2.

In the first and second embodiments, one group of three terminals 2 is made to display a plurality of pieces of content 5 corresponding to a common call marker 61.

However, a user sometimes intend to handle the groups separately to display a plurality of pieces of content 5 for each group.

In the third embodiment, the document server 1 provides each of the groups with the content 5.

In the third embodiment, the overall configuration of the document viewing system 100 is similar to that shown in FIG. 1 of the first or second embodiment. The hardware configuration of the document server 1 and the hardware configuration of the terminal 2 are similar to those shown in FIGS. 2 and 3 of the first or second embodiment.

However, the ROM 10c or the large-capacity storage 10d of the document server 1 stores therein a document providing program 10R.

The document providing program 10R is to provide the terminal 2 with the content 5 by using the method according to the first embodiment. The document providing program 10R enables providing the content 5 to the groups separately.

The document providing program 10R implements, in the document server 1, an image data storage portion 131, a call marker storage portion 132, a content information storage portion 133, a marker information selection portion 134, a singular/plural content determination portion 135, a content-to-be-sent determination portion 136, a content data transmission portion 137, an attribute data updating portion 138, a table selection portion 139, a setting processing portion 130, and so on, all of which are shown in FIG. 24.

The ROM 20c or the flash memory 20d of the terminal 2 stores therein a document viewing program 20R.

The document viewing program 20R implements, in the terminal 2, an access request portion 231, a content display processing portion 232, a display end notifying portion 233, a reply processing portion 234, and so on.

The description goes on to the individual portions of the document server 1 and the terminal 2 shown in FIG. 24. Description of points common to the first embodiment shall be omitted.

[Data]

Figure 27:
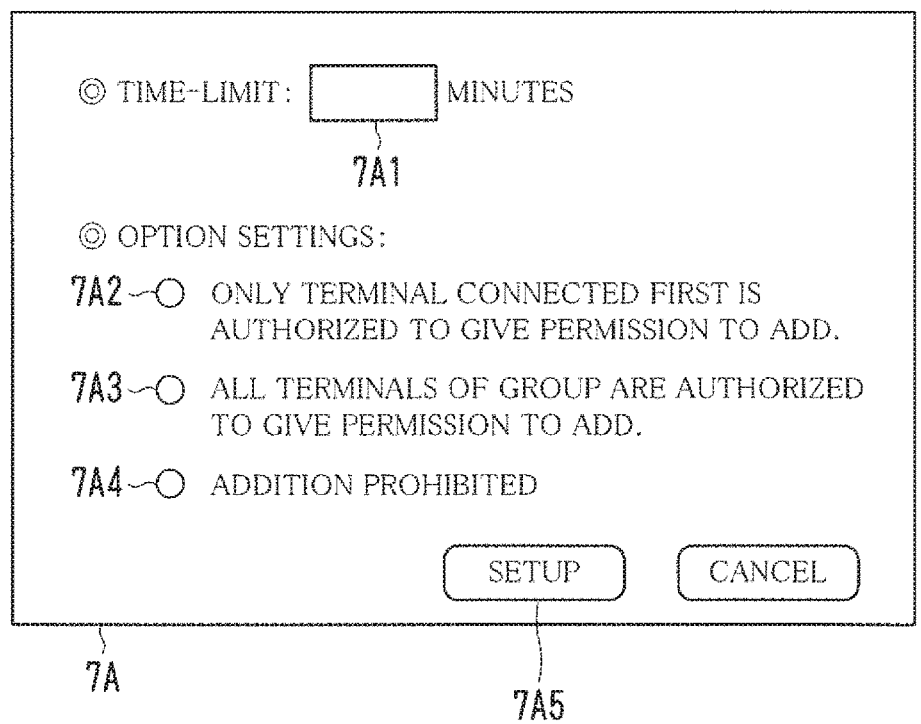
FIG. 27 is a diagram showing an example of a setting page.

FIG. 25 is a diagram showing an example of a content table 4M. FIG. 26 is a diagram showing an example of group participation control data 4N. FIG. 27 is a diagram showing an example of a setting page 7A.

The functions of the image data storage portion 131, the call marker storage portion 132, and the content information storage portion 133 are basically the same as those of the image data storage portion 101, the call marker storage portion 102, and the content information storage portion 103 (see FIG. 6), respectively.

The content information storage portion 133, however, stores, for each call marker 61, the content table 4M shown in FIG. 25 instead of the content table 4C (see FIG. 9). The content table 4M is stored on a group-by-group basis. At first, no content table 4M is stored in the content information storage portion 133. The content table 4M is generated, if necessary, by the table selection portion 139 described later.

The content table 4M has records 4Ma stored for each piece of content 5. Each of the records 4Ma shows information similar to that of the record 4Ca. Each of the records 4Ma further shows information on connection start date/time and disconnection date/time. The initial value thereof is "NULL" each. The connection start date/time and the disconnection date/time are described later.

Each of the content tables 4M is made to correspond to a group name of a group to which the content table 4M is assigned.

The content information storage portion 133 also stores, therein, the group participation control data 4N for each call marker 61 as shown in FIG. 26.

The group participation control data 4N indicates a limitation applied for the terminal 2 to join a group corresponding to the call marker 61.

In the meantime, as described later, when access request data 4D and image data on the call marker 61 are sent by the terminal 2, the terminal 2 is permitted to participate in a group corresponding to the call marker 61. As for the participation by the terminal 2 to the group corresponding to the call marker 61, the document server 1 has the following rules:

(1) Where no group corresponding to the call marker 61 is provided, a new group is made for the call marker 61 so that the terminal 2 is permitted to join the new group.
(2) At the time of the receipt of the access request data 4D, etc. from the terminal 2, where a predetermined amount of time (hereinafter, referred to as "time-limit T1") has not yet elapsed since another terminal 2 sent access request data 4D and image data on the call marker 61 the last time, the terminal 2 is permitted to join the group of that another terminal 2.
(3) As an exception of (2), even when the time-limit T1 has elapsed, where another preset terminal 2 which has already joined the group (hereinafter, referred to as an "authorizing terminal") gives permission to the terminal 2, the terminal 2 is permitted to join the group.
(4) Where none of (1)-(3) is applicable, a new group is made for the call marker 61 so that the terminal 2 is permitted to join the group.

The group participation control data 4N is set by a provider of the content for the call marker 61 or an administrator of the document server 1. The description goes on to an example of processing and operation for setting a call marker 61.

The provider or the administrator enters a URL of a predetermined web page of the document server 1 into a web browser of a computer such as a tablet computer (hereinafter, referred to as a "managing computer"). In response to the entry, the managing computer requests the web page from the document server 1.

With the document server 1, when receiving the request from the managing computer, the setting processing portion 130 sends, to the managing computer, data used for displaying the setting page 7A as that shown in FIG. 27.

Upon the receipt of the data, the managing computer displays the setting page 7A. The user enters and selects options in the setting page 7A in the following manner.

The user enters the time-limit T1 into a text box 7A1. When he/she intends to use only the terminal 2 which has joined the group first as the authorizing terminal, he/she checks a radio button 7A2. In contrast, when intending to use each of the terminals 2 joining the group as the authorizing terminal, he/she checks a radio button 7A3. When intending to use none of the terminals 2 as the authorizing terminal, namely, when the exception stated in (4) is not applied, he/she checks a radio button 7A4. After that, he/she presses a setup button 7A5.

In response to the setup button 7A5 pressed, the managing computer sends, to the document server 1, the group participation control data 4N and the image data on the call marker 61. The group participation control data 4N indicates the exceptional attribute and the time-limit T1 entered into the text box 7A1. When the radio button 7A2 is selected, the exceptional attribute indicates "1". When the radio button 7A3 is selected, the exceptional attribute indicates "2". When the radio button 7A4 is selected, the exceptional attribute indicates "3".

When receiving the group participation control data 4N and the image data on the call marker 61, the setting processing portion 130 stores, into the content information storage portion 133, the group participation control data 4N and the content table name of the content table 4M for the call marker 61 in association with each other.

[Processing for Providing Content 5]

Figure 28:
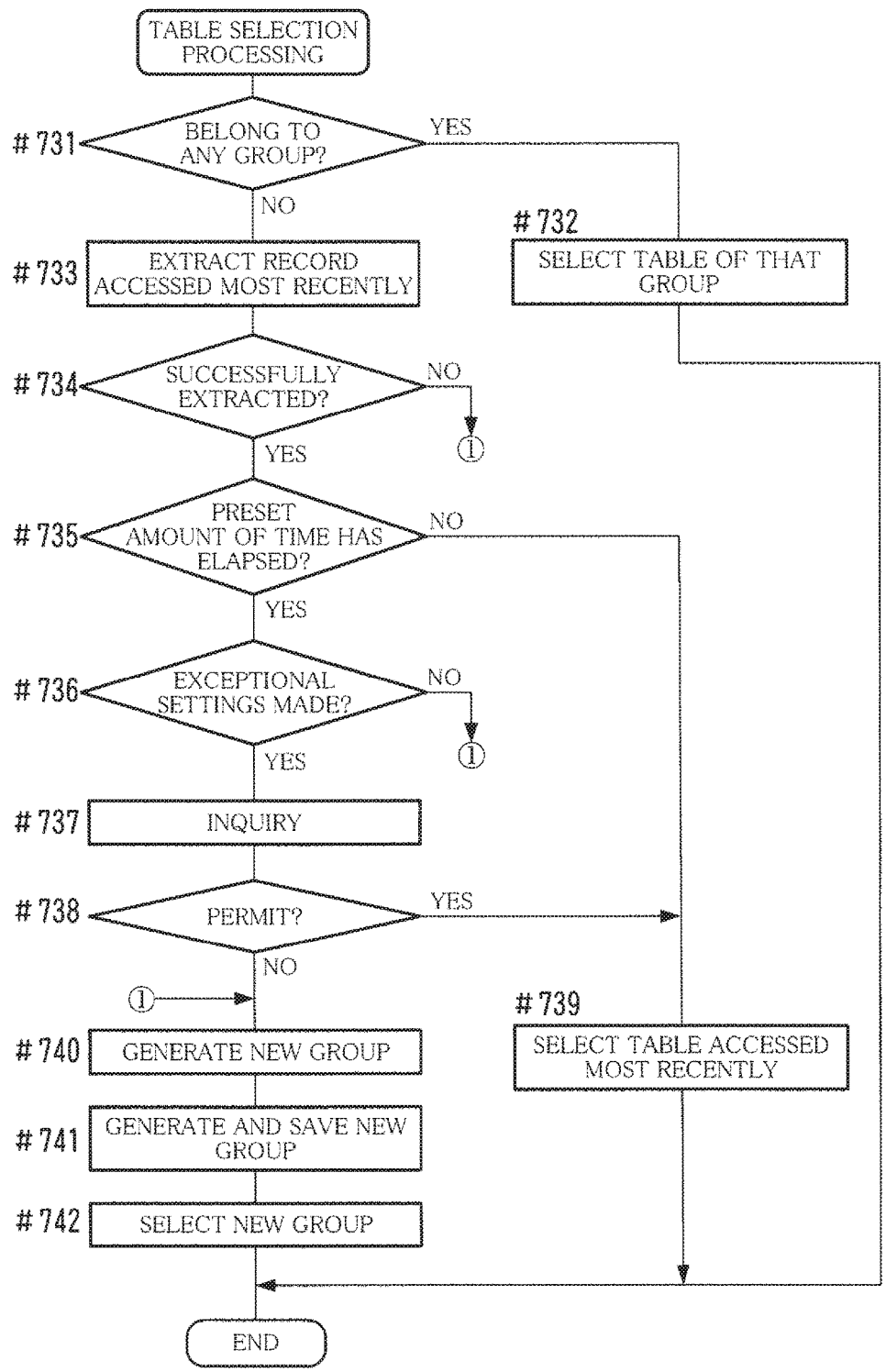
FIG. 28 is a flowchart depicting an example of the flow of table selection processing.

FIG. 28 is a flowchart depicting an example of the flow of table selection processing.

The user uses his/her terminal 2 to start the document viewing program 20R. In response to the operation, the access request portion 231 of the terminal 2 sends, to the document server 1, the access request data 4D together with image data on the call marker 61 photographed by the digital camera 20g, as with the access request portion 201 of the first embodiment. In this way, a request to access the content 5 is made.

With the document server 1, when receiving the access request data 4D and the image data on the call marker 61, the marker information selection portion 134 selects a marker name of the call marker 61 and a directory name of a directory where the content table 4C is stored, as with the marker information selection portion 104 of the first embodiment.

The singular/plural content determination portion 135 determines whether or not there is a plurality of pieces of content 5 corresponding to the call marker 61 sent by the terminal 2. The method for determination is similar to that by the singular/plural content determination portion 105 of the first embodiment.

The table selection portion 139 selects a content table 4M used to determine transmission target content to be sent to the terminal 2 which has sent the call marker 61. Hereinafter, the processing by the table selection portion 139 is described with reference to FIG. 28 by taking an example in which the terminal 2A is the transmission source.

When any of the records 4Ma of any of the content tables 4M for the call marker 61 indicates, as the output destination, an identifier of the terminal 2A (YES in Step #731 of FIG. 28), the table selection portion 139 selects the content table 4M containing the record 4Ma (Step #732).

When the identifier of the terminal 2A is not indicated in any of the records 4Ma of any of the content tables 4M (NO in Step #731), the table selection portion 139 attempts to extract, from all of content tables 4M for the call marker 61, a record 4Ma indicating the most recent (newest) connection start date/time (Step #733).

When such a record 4Ma is extracted successfully (YES in Step #734), the table selection portion 139 selects the content table 4M containing the record 4Ma (Step #739) provided that the current day/time is not later than the time-limit T1 since the connection start date/time indicated in the record 4Ma extracted (NO in Step #735). The time-limit T1 is set in the group participation control data 4N (see FIG. 26) for the call marker 61.

On the other hand, when the current day/time is later than the time-limit T1 (YES in Step #735), the table selection portion 139 performs the processing as described below in accordance with exceptional attributes indicated in the group participation control data 4N.

When the exceptional attribute indicates "3" (NO in Step #736), the table selection portion 139 makes a new group (Step #740). At this time, a new group name is issued. The table selection portion 139 also generates a new content table 4M, makes the new content table 4M correspond to the new group name and the content table name indicated in the attribute data 4B of the call marker 61 to register (save) the resultant into the content information storage portion 133 (Step #741). The table selection portion 139 then selects the content table 4M (Step #742).

When the exceptional attribute indicates "1" or "2" (YES in Step #736), the table selection portion 139 makes an inquiry, to another terminal 2 having already joined a group for the content table 4M containing the record 4Ma extracted in Step #733, as to whether or not to allow the terminal 2A to join the group (Step #737).

When the exceptional attribute indicates "1", the table selection portion 139 makes an inquiry only to a terminal 2 indicated as the output destination in a record 4Ma having the oldest connection start date/time among the records 4Ma contained in the content table 4M. When the exceptional attribute indicates "2", the table selection portion 139 makes an inquiry to all of terminals 2 indicated as the output destination in the records 4Ma contained in the content table 4M. In either case, each of the terminals 2 to which the inquiries are made is used as the authorizing terminal described above. The table selection portion 139 sends inquiry data 4P to each of the authorizing terminals.

Upon receiving the inquiry data 4P from the document server 1, the authorizing terminal (terminal 2) displays a dialog box for the user to select whether or not to permit the terminal 2A to join the group. He/she makes a selection. In response to the selection, the authorizing terminal sends selection result data 4Q showing the result of selection to the document server 1.

When receiving, from any one of the terminals 2, the selection result data 4Q indicating that the terminal 2A is permitted to join the group (YES in Step #738), the table selection portion 139 selects the content table 4M containing the record 4Ma extracted in Step #732 (Step #739).

When not receiving (NO in Step #738), from any of the terminals 2, the selection result data 4Q indicating that the terminal 2A is permitted to join the group, the table selection portion 139 generates a new content table 4M and issues a new group name (Step #740). The table selection portion 139 makes the new content table 4M correspond to the new group name and the content table name indicated in the attribute data 4B of the call marker 61 to register (save) the resultant into the content information storage portion 133 (Step #741). The table selection portion 139 then selects the content table 4M (Step #742).

The table selection portion 139 performs the processing of Step #740 through Step #742 when the record 4Ma is not extracted successfully (NO in Step #734), e.g., when there is no content table 4M for the call marker 61.

Referring back to FIG. 24, the content-to-be-sent determination portion 136 determines transmission target content to be sent to the terminal 2 which has sent the call marker 61, according to the steps depicted in FIG. 10 as with the content-to-be-sent determination portion 106 of the first embodiment. The content-to-be-sent determination portion 136, however, uses the content table 4M selected by the table selection portion 139 for the terminal 2 instead of the content table 4C.

The content data transmission portion 137 generates image data 4E on the content 5 which is determined to be the transmission target content by the content-to-be-sent determination portion 136. The content data transmission portion 137 then sends the image data 4E to the terminal 2 which has sent the access request data 4D in the following manner. The method for generating the image data 4E is similar to that by the content data transmission portion 107 according to the first embodiment, and is shown in FIG. 11. However, instead of the content table 4C, the content table 4M selected by the table selection portion 139 is used.

In connection with the transmission of the image data 4E on the content 5 from the content data transmission portion 137 to the terminal 2, the attribute data updating portion 138 updates the record 4Ha for the content 5. The method for updating is basically the same as the method for updating the record 4Ca by the attribute data updating portion 108 of the first embodiment.

The attribute data updating portion 138 further updates the connection start date/time to indicate date/time at which the terminal 2 makes connection with the document server 1. Alternatively, the attribute data updating portion 138 may update the connection start date/time to indicate date/time at which the access request data 4D is received from the terminal 2.

With the terminal 2, when the image data 4E is sent from the document server 1, the content display processing portion 232 displays the content 5 in the touch-sensitive panel display 20e, as with the content display processing portion 202 of the first embodiment.

When a command to finish displaying the content 5, the content display processing portion 232 finishes displaying the content 5 as with the content display processing portion 202 of the first embodiment.

The display end notifying portion 233 transmits the end notifying data 4F to the document server 1 as with the display end notifying portion 203 of the first embodiment.

In response to the transmission, the attribute data updating portion 138 of the document server 1 resets the values of the output destination and the message of the record 4Ma for the content 5. The reset method is the same as that for resetting the values of the output destination and the message of the record 4Ca by the attribute data updating portion 108 of the first embodiment.

The attribute data updating portion 138 further updates the connection end time indicated in the record 4Ma to indicate the date/time at which the end notifying data 4F is received.

Figure 29:
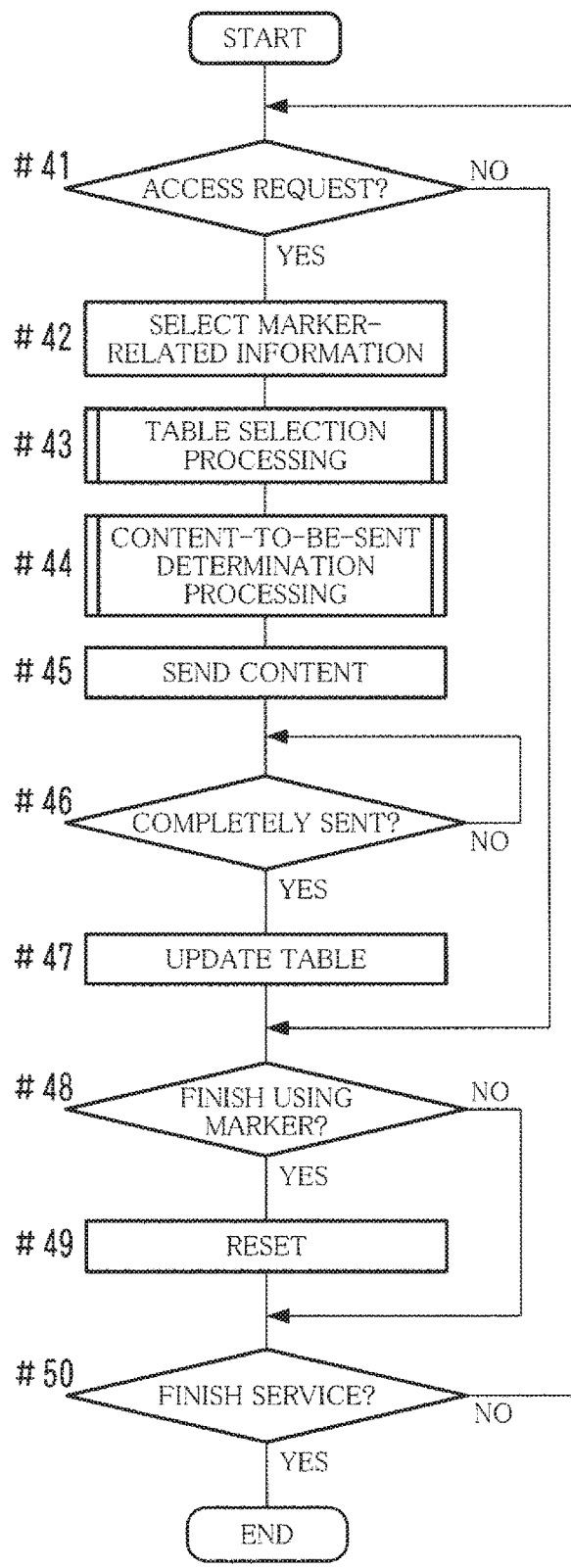
FIG. 29 is a flowchart depicting an example of the flow of the entire processing by a document server.

FIG. 29 is a flowchart depicting an example of the flow of the entire processing by the document server 1.

The description goes on to the flow of the entire processing performed when the document server 1 provides the content 5. The description is provided with reference to the flowchart.

The document server 1 executes the processing depicted in FIG. 29 based on the document providing program 10R.

The document server 1 receives, from the terminal 2, the access request data 4D and image data on the call marker 61 (Yes in Step #41 of FIG. 29). The document server 1 selects information on the call marker 61 (Step #42). The document server 1 determines a group of the terminal 2, and selects a content table 4M for the group (Step #43). The method for determination and selection is the same as that discussed earlier with reference to FIG. 28.

The document server 1 uses the content table 4M selected to determine content 5 to be sent to the terminal 2 (transmission target content) (Step #44). The method for determination is the same as that discussed earlier with reference to FIG. 10.

The document server 1 then generates image data 4E on the transmission target content to send the image data 4E to the terminal 2 (Step #45).

When the image data 4E is sent completely (YES in Step #46), the document server 1 updates the output destination of the record 4Ma for the transmission target content to indicate the identifier of the terminal 2, updates the connection start time to indicate the current time, and updates the connection end time to indicate "connecting". If the transmission status has a value of "unsent", then the document server 1 changes the value to "sent" (Step #47).

When receiving the end notifying data 4F from the terminal 2 (YES in Step #48), the document server 1 resets the output destination and the message indicated in the record 4Ma for the content 5 displayed in the terminal 2, and updates the connection end time to indicate the current time (Step #49).

While providing document delivery service, the document server 1 executes the processing from Step #41 though Step #47 and the processing from Step #48 through Step #50 appropriately.

Specific Example_3 for Providing Content 5 to Terminals 2

FIGS. 30A and 30B are diagrams showing an example of a content table 4M1. FIGS. 31A and 31B are diagrams showing an example of a content table 4M2.

According to the foregoing mechanism, the document server 1 is capable of providing each of groups with content 5. The description goes on to an example of transition of groups by taking an example in which pieces of content 501-503 (see FIG. 5) are provided as the content 5 corresponding to a call marker 61. The example is described with reference to FIGS. 30 and 31. It is supposed that the time-limit T1 of "20 minutes" is set in the group participation control data 4N (see FIG. 26) for the call marker 61.

The document server 1 receives, from the terminal 2A, the access request data 4D and image data on the call marker 61. At this point in time, none of the terminals 2 is given any of the pieces of content 501-503. Thus, no group has yet been made.

In view of this, the document server 1 makes a new group, issues a group name of "group 01", and generates a content table 4M1 as a new content table 4M. The document server 1 allows the terminal 2A to join the new group, and transmits image data 4E on the content 501 to the terminal 2A.

In connection with the transmission, the document server 1 updates the record 4Ma for the content 501 in the content table 4M1 as shown in FIG. 30A.

After receiving the access request data 4D and so on from the terminal 2A, the document server 1 receives, from the terminal 2B, the access request data 4D and image data on the call marker 61 before an elapsed time reaches the time-limit T1.

The document server 1 then allows the terminal 2B to join the same group as that of the terminal 2A. The document server 1 then transmits, to the terminal 2B, image data 4E on the next content 5, namely, the image data 4E on the content 502.

In connection with the transmission, the document server 1 updates the record 4Ma for the content 502 in the content table 4M1 as shown in FIG. 30B.

After receiving the access request data 4D and so on from the terminal 2B, the document server 1 receives, from the terminal 2D, the access request data 4D and image data on the call marker 61 after the time-limit T1 has elapsed.

When the exceptional attribute indicates "1" or "2" in the group participation control data 4N for the call marker 61, the document server 1 sends the inquiry data 4P to inquire of the authorizing terminal whether or not to permit the terminal 2D to join a group named "group 01".

When the selection result data 4Q sent by the authorizing terminal shows that the terminal 2D is permitted to join the group, the document server 1 permits the terminal 2D to join the group, and sends, to the terminal 2D, the image data 4E on the next content 5, namely, the image data 4E on the content 503. Herein, however, it is supposed that the selection result data 4Q received shows that the terminal 2D is not permitted to join the group.

In view of this, the document server 1 makes a new group, issues a group name of "group 02", and generates a content table 4M2 as a new content table 4M. The document server 1 allows the terminal 2D to join the new group to transmit the image data 4E on the content 501 to the terminal 2D. The same is similarly applied to the case where the exceptional attribute indicates "3".

In connection with the transmission, the document server 1 updates the record 4Ma for the content 501 in the content table 4M2 as shown in FIG. 31A.

After receiving the access request data 4D and so on from the terminal 2D, the document server 1 receives, from the terminal 2E, the access request data 4D and image data on the call marker 61 before an elapsed time reaches the time-limit T1.

The document server 1 allows the terminal 2E to join the same group as that of the terminal 2D. The document server 1 then transmits, to the terminal 2E, image data 4E on the next content 5, namely, the image data 4E on the content 502.

In connection with the transmission, the document server 1 updates the record 4Ma for the content 502 in the content table 4M2 as shown in FIG. 31B.

According to the third embodiment, it is possible to provide a plurality of pieces of content 5 to groups separately.

Modification_1

FIG. 32 is a diagram showing an example of operation assignment data 4R.

In the second embodiment, when a user swipes his/her finger vertically along the touch-sensitive panel display 20e of the terminal 2, the document server 1 provides content 5 which belongs to the same item as that of the current content and is subsequent to the current content. When the user swipes his/her finger horizontally across the touch-sensitive panel display 20e of the terminal 2, the document server 1 provides content 5 which belongs to an item subsequent to an item of the current content.

The document server 1 may provide the content 5 in different manners in accordance with various operation made on the terminal 2.

For example, when the user swipes his/her finger upward on the touch-sensitive panel display 20e, the document server 1 may provide content 5 which belongs to the same item as that of the current content and is subsequent to the current content. When the user swipes his/her finger downward on the touch-sensitive panel display 20e, the document server 1 may provide content 5 which belongs to the same item as that of the current content and immediately precedes the current content. When the user swipes his/her finger to right on the touch-sensitive panel display 20e, the document server 1 may provide content 5 which belongs to an item subsequent to an item of the current content. When the user swipes his/her finger to left on the touch-sensitive panel display 20e, the document server 1 may provide content 5 which belongs to an immediately preceding item of an item of the current content.

When the user shakes the terminal 2 up and down, the document server 1 may provide content 5 which belongs to the same item as that of the current content and is subsequent to the current content to the terminal 2. When the user shakes the terminal 2 in the right to left direction, the document server 1 may provide content 5 which belongs to the same item as that of the current content and is subsequent to the current content to the terminal 2. Shaking the terminal 2 up and down may be set as operation to permit another terminal 2 to join a group upon receiving the inquiry data 4P. Shaking the terminal 2 in the right to left direction may be set as operation not to permit another terminal 2 to join a group. Operation of shaking or tilting the terminal is detected by the acceleration sensor 20j.

It is possible to appropriately assign processing to be performed in response to operation of tilting the terminal 2 upward, downward, to left, or to right.

Such assignment may be managed in the document server 1 based on the operation assignment data 4R shown in FIG. 32. The document server 1 may perform processing based on the operation assignment data 4R. The user may change values of the operation assignment data 4R if necessary.

Modification_2

In the third embodiment, the document server 1 determines whether or not to allow the terminal 2 to join a group based on, mainly, time. Instead of this, the document server 1 may make such a determination based on the current location of the terminal 2.

Supposing that a car dealer having shops provides content 5 for a call marker 61, the document server 1 preferably performs processing as follows.

The document server 1 prepares, in advance, the content table 4M (see FIG. 25) for each shop, and makes a shop name correspond to the content table 4M as a group name.

The document server 1 receives, from the terminal 2, not only access request data 4D but current location data indicating the current location of the terminal 2. The document server 1 determines, based on the current location data received, which of the shops the terminal 2 is currently located in.

The terminal 2 preferably generates current location data by using a Global Positioning System (GPS) application installed in advance on the terminal 2, or a commercial application. When such applications are not installed on the terminal 2, the document server 1 preferably provides the terminal 2 with such applications.

The document server 1 allows the terminal 2 to join the group of the shop thus determined. The document server 1 uses the content table 4M for the group to determine transmission target content to be sent to the terminal 2 and to generate image data 4E. The document server 1 then sends the transmission target content and the image data 4E to the terminal 2.

The method for determining a group of the terminal 2 based on the current location thereof may be combined with the determination method based on time according to the third embodiment. In such a case, a plurality of groups is provided for one shop and the document server 1 may be so configured that and the content 5 is provided separately for the groups.

Modification_3

The document server 1 may make a group of terminals 2 located adjacent to one another, and generate the content table 4M for each of the groups.

The document server 1 receives, from the terminal 2, not only the access request data 4D but peripheral device data. The peripheral device data indicates identifiers of other terminals 2 detected by the short-range wireless communication device 20i of the subject terminal 2. If the short-range wireless communication device 20i is compatible with Bluetooth, a twelve-digit address such as "AA:BB:CC:DD:EE:FF" is used as the identifier.

Every time receiving the peripheral device data from the terminal 2, the document server 1 checks whether or not the peripheral device data indicates identifiers of other terminals 2 which have already sent the access request data 4D.

When the peripheral device data does not indicate any identifiers of such other terminals 2, the document server 1 makes a new group and a content table 4M therefor to allow the terminal 2 to join the new group. In contrast, when the peripheral device data indicates an identifier of any of other terminals 2, the document server 1 allows the terminal 2 to join the same group as that of such any of other terminals 2.

Modification_4

Figure 33:
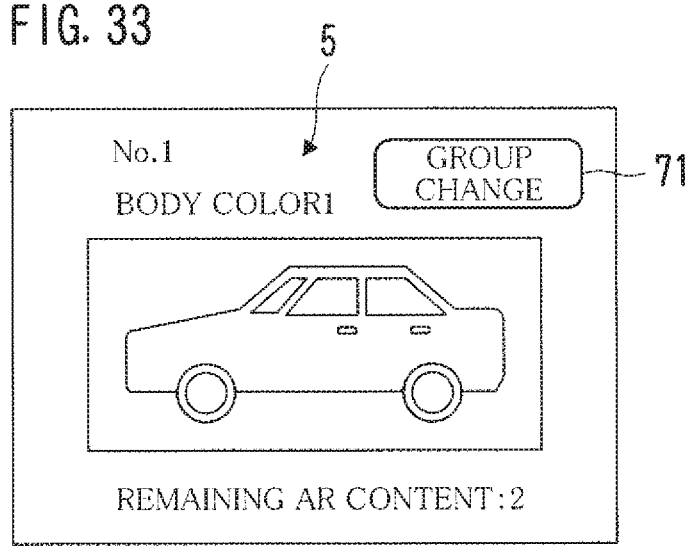
FIG. 33 is a diagram showing an example of content displayed together with a group change button.
Figure 34:
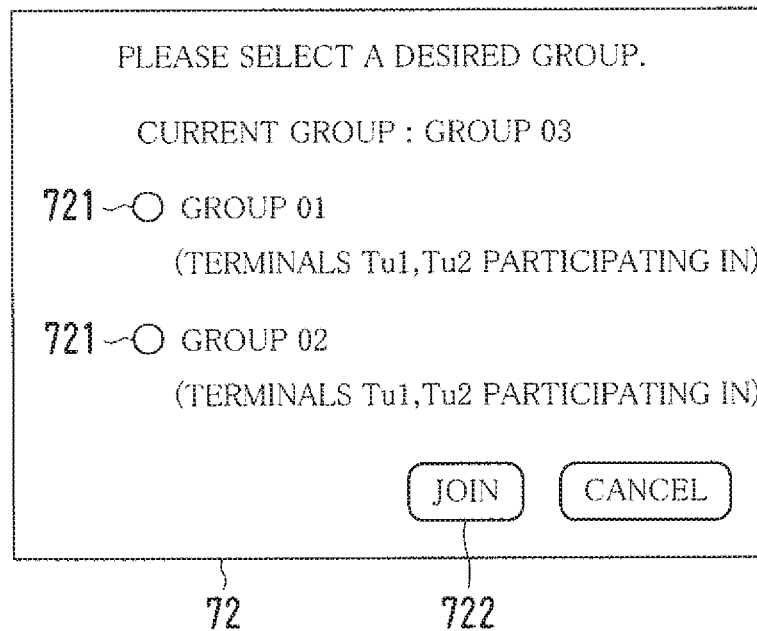
FIG. 34 is a diagram showing an example of a group change screen.

FIG. 33 is a diagram showing an example of content 5 displayed together with a group change button 71. FIG. 34 is a diagram showing an example of a group change screen 72.

In the third embodiment, the user may select a group in which the terminal 2 is to participate, for example, in the following manner. Hereinafter, an example is described of changing the group of the terminal 2C from the current group to another group.

When receiving, from the terminal 2C, the access request data 4D and image data on the call marker 61, the document server 1 sends, as the image data 4E, the content 5 and image data used for displaying the group change button 71 to the terminal 2C.

Upon receipt of the image data 4E, the terminal 2C displays a screen in which the content 5 and the group change button 71 are provided as shown in FIG. 33.

When the user presses the group change button 71 on the screen, the terminal 2C requests a list of groups from the document server 1.

In response to the request, the document server 1 sends image data on the group change screen 72 shown in FIG. 34 to the terminal 2C. The group change screen 72 has, for example, a group name of a group in which the terminal 2C currently participates, a group name of another group for the call marker 61, and radio buttons 721.

Upon the receipt of the image data, the terminal 2C displays the group change screen 72. The user selects, on the group change screen 72, the radio button 721 for a group in which he/she intends to make the terminal 2C participate. The user then presses a join button 722.

The terminal 2C then informs the document server 1 of a group corresponding to the selected radio button 721.

The document server 1 allows the terminal 2C to join the group informed. The document server 1 determines transmission target content to be sent to the terminal 2C based on the content table 4M for the group, and sends the image data 4E on the transmission target content to the terminal 2C.

Other Modifications

In the embodiments discussed above, the AR marker is used as the call marker 61. Instead of this, an image of another standard, e.g., a Quick Response (QR) code (registered trademark) may be used as the call marker 61.

When the QR code is used as the call marker 61, a path (see FIG. 7) corresponding to the call marker 61 may be embedded in the call marker 61, instead of being stored in the call marker storage portion 102. In such a case, the document server 1 receives the call marker 61 from the terminal 2, and preferably analyzes the call marker 61 to obtain the path.

The document server 1 may provide the terminal 2 with content such as a moving image or audio as the content 5.

In the second embodiment, the example is described in which the content 5 is classified into any one of two items. The present invention is not limited thereto, and is also applicable to the case where the content 5 is classified into any one of at least three items. According to the foregoing embodiments, since a plurality of pieces of content corresponding to a marker is sent to each of terminals in order from a piece of the content which has not yet been sent, it is possible to provide the plurality of pieces of content in such a manner that a user compares therebetween more easily than is conventionally possible.

It is to be understood that the overall configuration of the document viewing system 100, the document server 1, and the terminal 2, the constituent elements thereof, the content and order of the processing, the configuration of data and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A server for providing a plurality of contents corresponding to a marker in response to a request from a terminal, the server comprising:
    a storage configured to store the plurality of contents therein, to store a sequence number of each of the plurality of contents corresponding to the marker, and to store a transmission status of each of the plurality of contents indicating whether or not the corresponding content has been sent; and
    a processor which is configured to:
        receive a first request from a first terminal which has read the marker to send one of the plurality of contents corresponding to the marker to the first terminal;
        determine one of the plurality of contents corresponding to the marker to send to the first terminal, wherein the processor determines, as the one of the plurality of contents to send to the first terminal, a content having a smallest sequence number from among contents of the plurality of contents having a transmission status indicating that the corresponding content has not been sent;
        perform a first transmission to send, to the first terminal which has read the marker and which sent the first request, the determined one of the contents stored in the storage;
        update the transmission status of said one of the contents sent to the first terminal to indicate that said one of the contents has been sent;
        receive a second request from a second terminal which has read the marker to send one of the plurality of contents corresponding to the marker to the second terminal;
        determine another one the plurality of contents corresponding to the marker to send to the second terminal, wherein the processor determines, as said another one of the plurality of contents to send to the second terminal, a content having a smallest sequence number from among contents of the plurality of contents having a transmission status indicating that the corresponding content has not been sent; and
        perform a second transmission to send, after performing the first transmission to send said one of the contents to the first terminal, said determined another one of the contents stored in the storage to the second terminal which has read the marker.

2. The server according to claim 1, wherein the first terminal to which the processor sends said one of the contents in the first transmission is different from the second terminal to which the processor sends said another one of the contents in the second transmission.

3. The server according to claim 1, wherein:
    the server is communicably connected to a plurality of terminals including the first terminal and the second terminal;
    each of the contents is classified into any of a plurality of items; and
    the processor is configured to transmit, to all of the terminals, respective different contents from among the plurality of contents classified into one of the plurality of items; and
    in accordance with an operation performed at any one of the terminals after the transmission to all of the terminals of the respective different contents classified into said one of the plurality of items, the processor is configured to send, to all of the terminals, respective different contents from among the plurality of contents classified into another one of the plurality of items.

4. The server according to claim 1, wherein:
    the server is communicably connected to a plurality of terminals including the first terminal and the second terminal;
    each of the contents is classified into any of a plurality of items and the contents are given a predetermined sequential order;
    the processor is configured to transmit, to all of the terminals, respective different contents from among the plurality of contents classified into one of the plurality of items;
    in accordance with a first operation performed at any one of the terminals after the transmission to all of the terminals of the respective different contents classified into said one of the plurality of items, the processor is configured to send, to all of the terminals, a respective next content that is next to the respective different content that had just been transmitted in the predetermined sequential order, from among the plurality of contents classified into said one of the plurality of items; and
    in accordance with a second operation performed at any of the terminals after the transmission to all of the terminals of the respective different contents classified into said one of the plurality of items, the processor is configured to send, to all of the terminals, respective different contents from among the plurality of contents which are classified into another one of the plurality of items.

5. The server according to claim 4, wherein the first operation and the second operation are preset operations performed with an acceleration sensor or via a gesture on a touch panel.

6. The server according to claim 1, wherein the server is communicably connected to a plurality of the terminals including the first terminal and the second terminal, and the terminals are located in a same place as one another.

7. The server according to claim 1, wherein:
the server is communicably connected to a plurality of the terminals including the first terminal and the second terminal;
each of the terminals is provided with a communication device for performing near field communication; and
the terminals are located within such an area that each of the terminals performs near field communication with the communication device.

8. A method for providing, from a server, a plurality of contents corresponding to a marker in response to a request from a terminal, the server comprising a storage configured to store the plurality of contents therein, to store a sequence number of each of the plurality of contents corresponding to the marker, and to store a transmission status of each of the plurality of contents indicating whether or not the corresponding content has been sent, the method comprising:
receiving a first request from a first terminal which has read the marker to send one of the plurality of contents corresponding to the marker to the first terminal;
determining one of the plurality of contents corresponding to the marker to send to the first terminal, wherein the determining comprises determining, as the one of the plurality of contents to send to the first terminal, a content having a smallest sequence number from among contents of the plurality of contents having a transmission status indicating that the corresponding content has not been sent;
performing a first transmission to send, to the first terminal which has read the marker and which sent the first request, the determined one of the plurality of contents stored in the storage;
updating the transmission status of said one of the contents sent to the first terminal to indicate that said one of the contents has been sent;
receiving a second request from a second terminal which has read the marker to send one of the plurality of contents corresponding to the marker to the second terminal;
determining another one the plurality of contents corresponding to the marker to send to the second terminal, wherein the determining another one of the plurality contents comprises determining, as said another one of the plurality of contents to send to the second terminal, a content having a smallest sequence number from among contents of the plurality of contents having a transmission status indicating that the corresponding content has not been sent; and
performing a second transmission to send, after performing the first transmission to send said one of the contents to the first terminal, said determined another one of the contents stored in the storage to the second terminal which has read the marker.

9. A non-transitory computer-readable storage medium having stored thereon a computer program that is executable by a computer of a server for providing a plurality of contents corresponding to a marker in response to a request from a terminal, the server comprising a storage configured to store the plurality of contents therein, to store a sequence number of each of the plurality of contents corresponding to the marker, and to store a transmission status of each of the plurality of contents indicating whether or not the corresponding content has been sent, the computer program causing the computer to perform processing comprising:
receiving a first request from a first terminal which has read the marker to send one of the plurality of contents corresponding to the marker to the first terminal;
determining one of the plurality of contents corresponding to the marker to send to the first terminal, wherein the determining comprises determining, as the one of the plurality of contents to send to the first terminal, a content having a smallest sequence number from among contents of the plurality of contents having a transmission status indicating that the corresponding content has not been sent;
performing a first transmission to send, to the first terminal which has read the marker and which sent the first request, the determined one of the plurality of contents stored in the storage;
updating the transmission status of said one of the contents sent to the first terminal to indicate that said one of the contents has been sent;
receiving a second request from a second terminal which has read the marker to send one of the plurality of contents corresponding to the marker to the second terminal;
determining another one the plurality of contents corresponding to the marker to send to the second terminal, wherein the determining another one of the plurality contents comprises determining, as said another one of the plurality of contents to send to the second terminal, a content having a smallest sequence number from among contents of the plurality of contents having a transmission status indicating that the corresponding content has not been sent; and
performing a second transmission to send, after performing the first transmission to send said one of the contents to the first terminal, said determined another one of the contents stored in the storage to the second terminal which has read the marker.

10. The non-transitory computer-readable storage medium according to claim 9, wherein the first terminal to which said one of the contents in the first transmission is sent is different from the second terminal to which the said another one of the contents in the second transmission is sent.

11. The non-transitory computer-readable storage medium according to claim 9, wherein:
the server is communicably connected to a plurality of terminals including the first terminal and the second terminal;
each of the contents is classified into any of a plurality of items; and
the computer program causes the computer to perform processing comprising:
transmitting, to all of the terminals, respective different contents from among the plurality of contents classified into one of the plurality of items; and
in accordance with an operation performed at any one of the terminals after the transmission to all of the terminals of the respective different contents classified into said one of the plurality of items, sending, to all of the terminals, respective different contents from among the plurality of contents classified into another one of the plurality of items.

12. The non-transitory computer-readable storage medium according to claim 9, wherein:
the server is communicably connected to a plurality of terminals including the first terminal and the second terminal;

each of the contents is classified into any of a plurality of items and the contents are given a predetermined sequential order; and the computer program causes the computer to perform processing comprising:

transmitting, to all of the terminals, respective different contents from among the plurality of contents classified into one of the plurality of items;

in accordance with a first operation performed at any one of the terminals after the transmission to all of the terminals of the respective different contents classified into said one of the plurality of items, sending, to all of the terminals, a respective next content that is next to the respective different content that had just been transmitted in the predetermined sequential order, from among the plurality of contents classified into said one of the plurality of items; and in accordance with a second operation performed at any of the terminals after the transmission to all of the terminals of the respective different contents classified into said one of the plurality of items, sending, to all of the terminals, respective different contents from among the plurality of contents which are classified into another one of the plurality of items.

13. The non-transitory computer-readable storage medium according to claim 12, wherein the first operation and the second operation are preset operations performed with an acceleration sensor or via a gesture on a touch panel.

14. The non-transitory computer-readable storage medium according to claim 9, wherein the server is communicably connected to a plurality of the terminals including the first terminal and the second terminal, and the terminals are located in a same place as one another.

15. The non-transitory computer-readable storage medium according to claim 9, wherein:

the server is communicably connected to a plurality of the terminals including the first terminal and the second terminal;

each of the terminals is provided with a communication device for performing near field communication; and the terminals are located within such an area that each of the terminals performs near field communication with the communication device.

* * * * *